(12) United States Patent
Pezeshki et al.

(10) Patent No.: US 12,035,162 B2
(45) Date of Patent: Jul. 9, 2024

(54) SWITCHING REFERENCE SIGNALS FOR BEAM OR LINK FAILURE DETECTION

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/178,616

(22) Filed: Mar. 6, 2023

(65) Prior Publication Data

US 2023/0209380 A1 Jun. 29, 2023

Related U.S. Application Data

(63) Continuation of application No. 17/189,099, filed on Mar. 1, 2021, now Pat. No. 11,601,831.

(60) Provisional application No. 62/985,831, filed on Mar. 5, 2020.

(51) Int. Cl.
| | |
|---|---|
| *H04W 24/08* | (2009.01) |
| *H04B 7/06* | (2006.01) |
| *H04B 7/08* | (2006.01) |
| *H04L 5/00* | (2006.01) |
| *H04W 36/30* | (2009.01) |
| *H04W 56/00* | (2009.01) |
| *H04W 80/02* | (2009.01) |

(52) U.S. Cl.
CPC .......... *H04W 24/08* (2013.01); *H04B 7/0626* (2013.01); *H04B 7/0695* (2013.01); *H04L 5/0051* (2013.01); *H04W 56/001* (2013.01); *H04W 80/02* (2013.01)

(58) Field of Classification Search
CPC ... H04W 24/08; H04W 56/001; H04W 80/02; H04W 36/305; H04B 7/0626; H04B 7/0695; H04B 7/088; H04L 5/0051; H04L 5/0048
See application file for complete search history.

(56) References Cited

U.S. PATENT DOCUMENTS

| | | | |
|---|---|---|---|
| 11,082,103 B2 | 8/2021 | Lee et al. | |
| 11,601,831 B2 * | 3/2023 | Pezeshki | H04W 24/08 |
| 2016/0294514 A1 * | 10/2016 | Tang | H04W 76/14 |
| 2018/0076856 A1 * | 3/2018 | Tong | H04W 72/046 |

(Continued)

FOREIGN PATENT DOCUMENTS

WO 2019192523 10/2019

OTHER PUBLICATIONS

International Preliminary Report on Patentability—PCT/US2021/070209, The International Bureau of WIPO—Geneva, Switzerland, Sep. 15, 2022.

(Continued)

*Primary Examiner* — Harry H Kim
(74) *Attorney, Agent, or Firm* — Harrity & Harrity, LLP/QUALCOMM Incorporated

(57) ABSTRACT

Various aspects of the present disclosure generally relate to wireless communication. In some aspects, a user equipment (UE) may determine to switch from monitoring for a first reference signal to monitoring for a second reference signal, and monitor for the second reference signal. Numerous other aspects are provided.

33 Claims, 15 Drawing Sheets

(56) References Cited

U.S. PATENT DOCUMENTS

| | | | |
|---|---|---|---|
| 2018/0279145 A1* | 9/2018 | Jung | H04B 17/382 |
| 2019/0081691 A1 | 3/2019 | Nagaraja et al. | |
| 2020/0100154 A1 | 3/2020 | Cirik et al. | |
| 2020/0267768 A1 | 8/2020 | Hakola et al. | |
| 2020/0274679 A1 | 8/2020 | Futaki | |
| 2020/0322887 A1* | 10/2020 | Pao | H04L 5/0057 |
| 2020/0367087 A1 | 11/2020 | Lim et al. | |
| 2021/0068123 A1 | 3/2021 | Zhu et al. | |
| 2021/0105765 A1 | 4/2021 | Cirik et al. | |
| 2021/0282036 A1* | 9/2021 | Pezeshki | H04B 7/0626 |

OTHER PUBLICATIONS

International Search Report and Written Opinion—PCT/US2021/070209—ISA/EPO—Jun. 4, 2021.
Qualcomm Incorporated: "Radio Link Monitoring Consideration", 3GPP Draft, 3GPP TSG RAN WG1 Meeting #92, R1-1802816 Radio Link Monitoring Consideration, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018 Feb. 17, 2018, XP051398228, pp. 1-7, pp. 1.2, figure 2.

* cited by examiner

SWITCHING REFERENCE SIGNALS FOR BEAM OR LINK FAILURE DETECTION

CROSS-REFERENCE TO RELATED APPLICATION

This application is a continuation of U.S. patent application Ser. No. 17/189,099, filed Mar. 1, 2021 (now U.S. Pat. No. 11,601,831), entitled "SWITCHING REFERENCE SIGNALS FOR BEAM OR LINK FAILURE DETECTION," which claims priority to U.S. Provisional Patent Application No. 62/985,831, filed on Mar. 5, 2020, entitled "SWITCHING REFERENCE SIGNALS FOR BEAM OR LINK FAILURE DETECTION," the contents of which are incorporated herein by reference in their entireties.

INTRODUCTION

Aspects of the present disclosure generally relate to wireless communication and to techniques and apparatuses for switching reference signals.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BS s) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include transmitting, to a base station, a request for the base station to switch from configuring the UE with a first reference signal to configuring the UE with a second reference signal. The method may include receiving, from the base station, a configuration to switch from monitoring for the first reference signal to monitoring for the second reference signal. The method may also include monitoring for the second reference signal based at least in part on receiving the configuration.

In some aspects, a method of wireless communication performed by a base station may include receiving, from a UE, a request for the base station to switch from configuring the UE with a first reference signal to configuring the UE with a second reference signal. The method may include transmitting a configuration to switch from monitoring for the first reference signal to monitoring for the second reference signal.

In some aspects, a UE for wireless communication may include a memory and one or more processors coupled to the memory. The memory and the one or more processors may be configured to transmit, to a base station, a request for the base station to switch from configuring the UE with a first reference signal to configuring the UE with a second reference signal. The memory and the one or more processors may be configured to receive, from the base station, a configuration to switch from monitoring for the first reference signal to monitoring for the second reference signal. The memory and the one or more processors may be configured to monitor for the second reference signal based at least in part on receiving the configuration.

In some aspects, a base station for wireless communication may include a memory and one or more processors coupled to the memory, the memory and the one or more processors may be configured to receive, from a UE, a request for the base station to switch from configuring the UE with a first reference signal to configuring the UE with a second reference signal. The memory and the one or more processors may be configured to transmit a configuration to switch from monitoring for the first reference signal to monitoring for the second reference signal.

In some aspects, a non-transitory computer-readable medium may store one or more instructions for wireless communication. The one or more instructions, when executed by one or more processors of a UE, cause the UE to transmit, to a base station, a request for the base station to switch from configuring the UE with a first reference signal to configuring the UE with a second reference signal. The one or more instructions, when executed by one or more processors of a UE, cause the UE to receive, from the base station, a configuration to switch from monitoring for the first reference signal to monitoring for the second reference signal, and monitor for the second reference signal based at least in part on receiving the configuration.

In some aspects, a non-transitory computer-readable medium may store one or more instructions for wireless communication. The one or more instructions, when executed by one or more processors of a base station, cause the base station to receive, from a UE, a request for the base station to switch from configuring the UE with a first reference signal to configuring the UE with a second reference signal, and transmit a configuration to switch from monitoring for the first reference signal to monitoring for the second reference signal.

In some aspects, an apparatus for wireless communication may include means for transmitting, to a base station, a request for the base station to switch from configuring the apparatus with a first reference signal to configuring the apparatus with a second reference signal. The apparatus may include means for receiving, from the base station, a configuration to switch from monitoring for the first reference signal to monitoring for the second reference signal. The apparatus may include means for monitoring for the second reference signal based at least in part on receiving the configuration.

In some aspects, an apparatus for wireless communication may include means for receiving, from a UE, a request for the base station to switch from configuring the UE with a first reference signal to configuring the UE with a second reference signal. The apparatus may include means for transmitting a configuration to switch from monitoring for the first reference signal to monitoring for the second reference signal.

In some aspects, a method of wireless communication, performed by a UE, may include determining to switch from monitoring a first reference signal to monitoring a second reference signal. The method may include monitoring for the second reference signal based at least in part on determining to switch.

In some aspects, a method of wireless communication, performed by a base station, may include determining to switch from configuring a UE with a first reference signal to configuring the UE with a second reference signal. The method may include transmitting a message instructing the UE to switch from monitoring the first reference signal to monitoring the second reference signal.

In some aspects, a UE for wireless communication may include a memory and one or more processors coupled to the memory. The memory and the one or more processors may be configured to determine to switch from monitoring a first reference signal to monitoring a second reference signal, and monitor for the second reference signal based at least in part on determining to switch.

In some aspects, a base station for wireless communication may include a memory and one or more processors coupled to the memory. The memory and the one or more processors may be configured to determine to switch from configuring a UE with a first reference signal to configuring the UE with a second reference signal, and transmit a message instructing the UE to switch from monitoring the first reference signal to monitoring the second reference signal.

In some aspects, a non-transitory computer-readable medium may store one or more instructions for wireless communication. The one or more instructions, when executed by one or more processors of a UE, may cause the one or more processors to determine to switch from monitoring a first reference signal to monitoring a second reference signal; and monitor for the second reference signal based at least in part on determining to switch.

In some aspects, a non-transitory computer-readable medium may store one or more instructions for wireless communication. The one or more instructions, when executed by one or more processors of a base station, may cause the one or more processors to determine to switch from configuring a UE with a first reference signal to configuring the UE with a second reference signal, and transmit a message instructing the UE to switch from monitoring the first reference signal to monitoring the second reference signal.

In some aspects, an apparatus for wireless communication may include means for determining to switch from monitoring a first reference signal to monitoring a second reference signal, and means for monitoring for the second reference signal based at least in part on determining to switch.

In some aspects, an apparatus for wireless communication may include means for determining to switch from configuring a UE with a first reference signal to configuring the UE with a second reference signal, and means for transmitting a message instructing the UE to switch from monitoring the first reference signal to monitoring the second reference signal.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
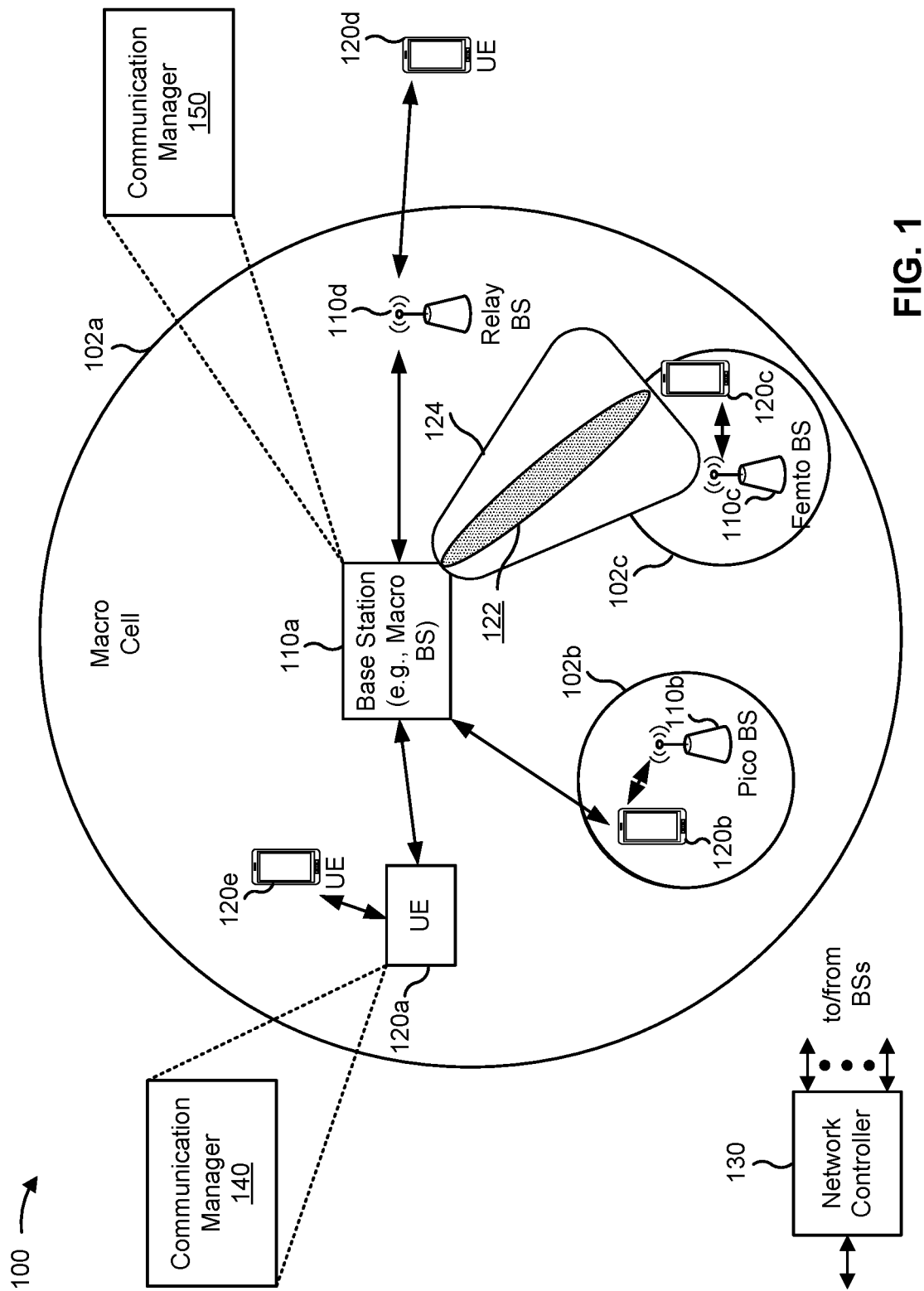
FIG. 1 is a diagram illustrating an example of a wireless communication network, in accordance with the present disclosure.

A user equipment (UE) may rely on a broadcast of a synchronization signal block (SSB) as a reference signal (RS) for radio link monitoring (RLM). The UE may determine that the UE still has a link to a serving cell if a signal strength (e.g., beamforming gain) of the SSB is sufficient. However, the UE may move away from coverage of the cell and the link may fail because the SSB is broadcast in a wide beam and may have a limited gain.

According to various aspects described herein, the UE may determine to switch from monitoring a wide SSB broadcast to monitoring a channel state information RS (CSI-RS), which is transmitted in a more focused beam and may have a higher beamforming gain. For example, the UE may transmit a request for a base station to switch from configuring the UE with monitoring for the wide SSB broadcast to monitoring for the CSI-RS. The UE may receive a configuration that instructs the UE to switch from monitoring for the wide SSB broadcast to monitoring for the CSI-RS. The UE may monitor for and more likely receive the CSI-RS, because the CSI-RS has a higher gain, or more radiated power in the direction of the UE. As a result, the UE may maintain the link for longer and/or at a greater distance than if the UE is monitoring for the wide SSB broadcast. The UE may conserve time, processing resources, and signaling resources that would otherwise be consumed by reestablishing a dropped link. While link failure is discussed in the context of RLM, various aspects of the present disclosure may also apply to beam failure detection (BFD) or other types of detection.

Various aspects of the disclosure are described in more detail hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT) aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a BS 110d may communicate with macro BS 110a and a UE 120d in order to facilitate communication between BS 110a and UE 120d. A relay BS may also be referred to as a relay station, a relay base station, and/or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology or an air interface. A frequency may also be referred to as a carrier or a frequency channel. Each frequency may support a single RAT in a given geographic area in order to avoid interference between wireless networks of different RATs. In some cases, NR or 5G RAT networks may be deployed.

A UE, such as UE 120c, may monitor for a first reference signal 122. The first reference signal 122 may be a wide beam. The first reference signal may be a radio link monitoring reference signal, beam failure detection reference signal, or an SSB. In some aspects, UE 120c may switch to monitoring for a second reference signal 124. The second reference signal may be a CSI-RS, which involves a narrower beam with more gain, or more radiating power that is received at UE 120c, than the wide beam for the SSB.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, UE 120 may perform scheduling operations, resource selection operations, and/or other operations described elsewhere herein as being performed by base station 110.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" (mmWave) band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

As shown in FIG. 1, UE 120 may include a communication manager 140. As described in more detail elsewhere herein, communication manager 140 may determine to switch from monitoring a first reference signal to monitoring a second reference signal and monitor for the second reference signal based at least in part on determining to switch. Communication manager 140 may transmit, to a base station, a request for the base station to switch from configuring the UE with a first reference signal to configuring the UE with a second reference signal. Communication manager may receive, from the base station, a configuration that instructs the UE to switch from monitoring for the first reference signal to monitoring for the second reference signal. Communication manager 140 may monitor for the second reference signal based at least in part on receiving the configuration. Additionally, or alternatively, communication manager 140 may perform one or more other operations described herein.

In some aspects, base station 110 may include a communication manager 150. As described in more detail elsewhere herein, communication manager 150 may determine to switch from configuring UE 120 with a first reference signal to configuring UE 120 with a second reference signal and transmit a message instructing UE 120 to switch from monitoring the first reference signal to monitoring the second reference signal. Communication manager 150 may receive, from a UE, a request for the base station to switch from configuring the UE with a first reference signal to configuring the UE with a second reference signal. Communication manager 150 may transmit a configuration that instructs the UE to switch from monitoring for the first reference signal to monitoring for the second reference signal. Additionally, or alternatively, communication manager 150 may perform one or more other operations described herein.

As indicated above, FIG. 1 is provided merely as an example. Other examples may differ from what is described with regard to FIG. 1.

Figure 2:
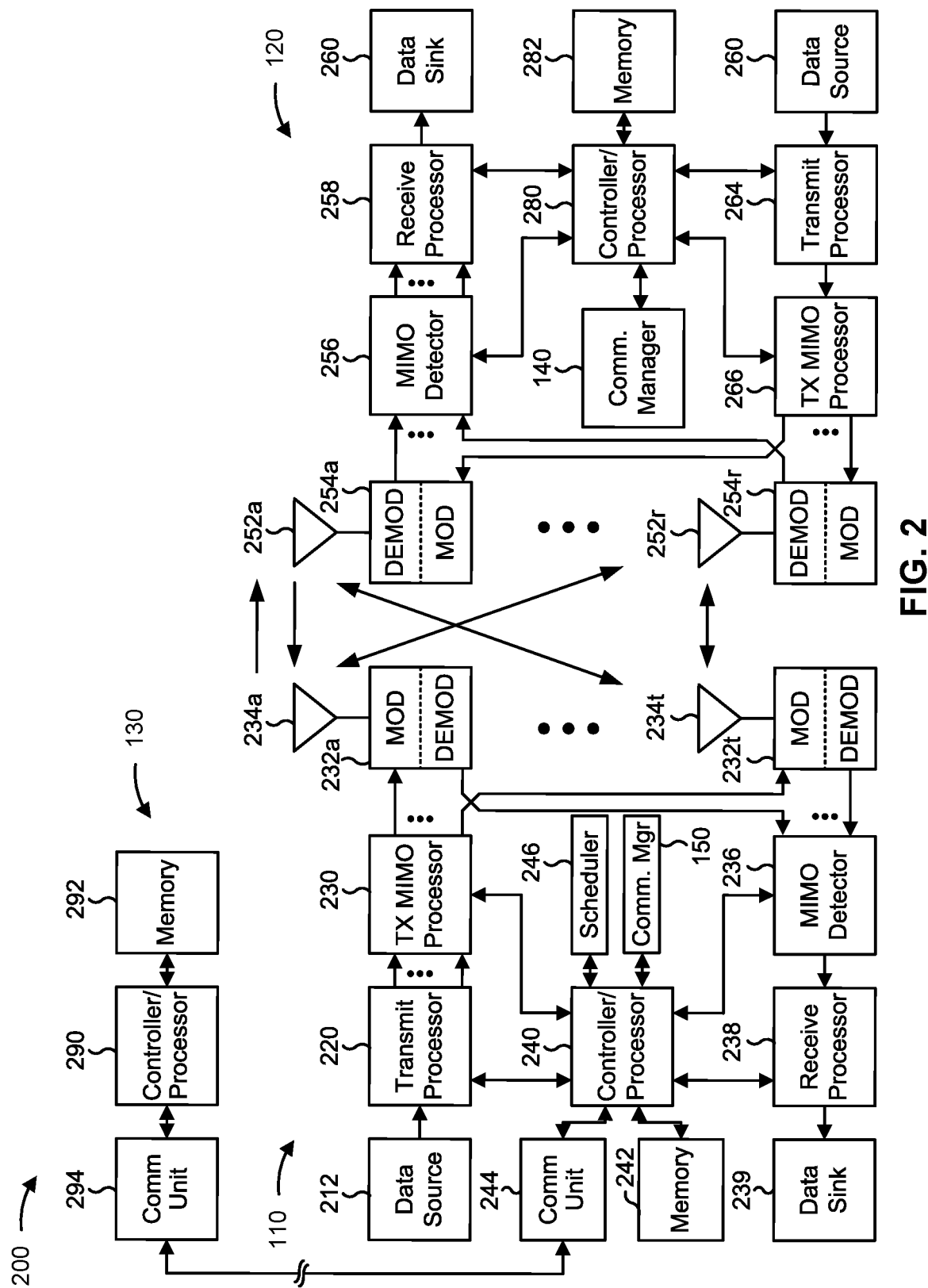
FIG. 2 is a diagram illustrating an example of a base station in communication with a UE in a wireless communication network, in accordance with the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of UE 120 may be included in a modem of UE 120. In some aspects, UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with switching reference signals for beam or link failure detection, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining to switch from monitoring a first reference signal to monitoring a second reference signal, and/or means for monitoring for the second reference signal based at least in part on determining to switch. Additionally, or alternatively, UE 120 may include means for performing one or more other operations described herein. In some aspects, such means may include communication manager 140. Additionally, or alternatively, such means may include one or more components of UE 120 described in connection with FIG. 2.

In some aspects, base station 110 may include means for determining to switch from configuring UE 120 with a first reference signal to configuring UE 120 with a second reference signal, and/or means for transmitting a message instructing UE 120 to switch from monitoring the first reference signal to monitoring the second reference signal. Additionally, or alternatively, base station 110 may include means for performing one or more other operations described herein. In some aspects, such means may include communication manager 150. In some aspects, such means may include one or more components of base station 110 described in connection with FIG. 2.

In some aspects, UE 120 may include means for transmitting, to a base station, a request for the base station to switch from configuring the UE with a first reference signal to configuring the UE with a second reference signal, means for receiving, from the base station, a configuration to switch from monitoring for the first reference signal to monitoring for the second reference signal, and/or means for monitoring for the second reference signal based at least in part on receiving the configuration. Additionally, or alternatively, UE 120 may include means for performing one or more other operations described herein. In some aspects, such means may include communication manager 140. Additionally, or alternatively, such means may include one or more components of UE 120 described in connection with FIG. 2.

In some aspects, base station 110 may include means for receiving, from a UE, a request for the base station to switch from configuring the UE with a first reference signal to configuring the UE with a second reference signal, and/or means for transmitting a configuration to switch from monitoring for the first reference signal to monitoring for the second reference signal. Additionally, or alternatively, base station 110 may include means for performing one or more other operations described herein. In some aspects, such means may include communication manager 150. In some aspects, such means may include one or more components of base station 110 described in connection with FIG. 2.

As indicated above, FIG. 2 is provided merely as an example. Other examples may differ from what is described with regard to FIG. 2.

A UE may rely on a broadcast of an SSB as an RS resource for link failure detection for RLM or for BFD. The UE may determine that the UE still has a link to a serving cell if a signal strength (e.g., beamforming gain) of the SSB is sufficient. Note that an SSB may also be referred to as a synchronization signal and physical broadcast channel. In some scenarios, the UE may move away from coverage of the cell and the link may fail, because the SSB is broadcast in a wide beam and may have a limited gain. For example, the UE may be configured with a resource (e.g., SSB) for RLM-RS, and if the downlink radio link quality on the configured RLM-RS resource estimated over an evaluation period becomes worse than a quality threshold, radio link failure (RLF) results.

According to various aspects described herein, the UE may determine to switch from monitoring a wide SSB broadcast to monitoring a CSI-RS, which is transmitted in a more focused beam and may have a higher beamforming gain. The UE may determine to switch based at least in part on signaling feedback from a BS or measurements by the UE. The UE may transmit, to the BS, a request to switch to monitoring for the CSI-RS, and the BS may indicate that the request is granted. As a result, the UE may maintain the link for longer and/or at a greater distance than if the UE is monitoring for the SSB broadcast. In some aspects, the UE may determine to switch to monitoring for the CSI-RS based at least in part on an instruction from the BS that is received without transmitting a request to switch to monitoring for the CSI-RS. For example, the BS may determine to configure the UE with the CSI-RS for RLM and/or BFD purposes, and the BS may instruct the UE accordingly. This instruction may be based at least in part on an explicit UE request or based at least in part on a measurement report from the UE on a configured reference signal. In one example, as a result of the switch, the UE may have a greater chance of maintaining the link by monitoring for the CSI-RS rather than by monitoring for the SSB broadcast. The UE may conserve time, processing resources, and signaling resources that would otherwise be consumed by reestablishing a dropped link.

Figure 3:
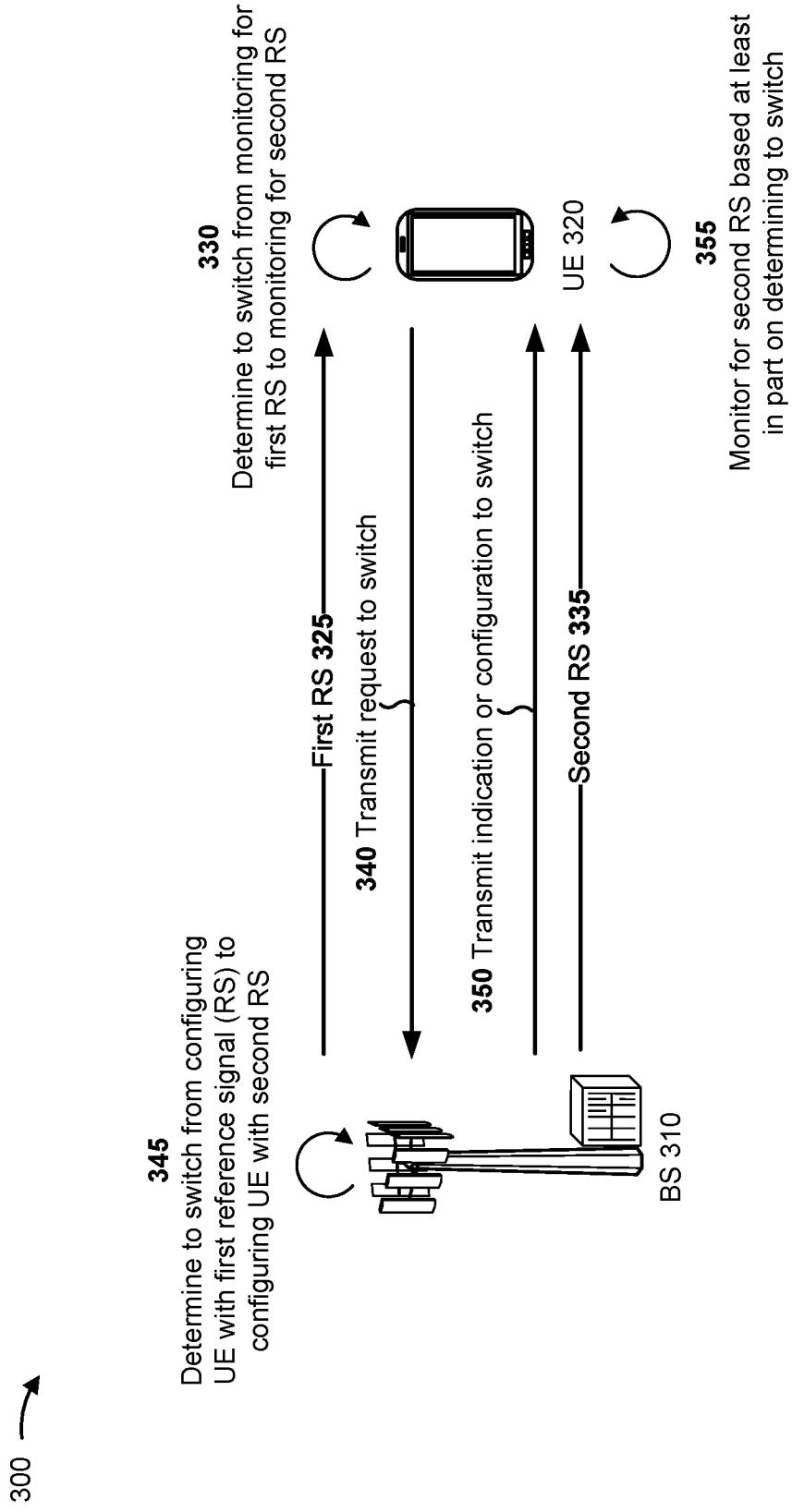
FIG. 3 is a diagram illustrating an example of switching reference signals for beam or link failure detection, in accordance with the present disclosure.

FIG. 3 is a diagram illustrating an example 300 of switching reference signals for beam or link failure detection, in accordance with various aspects of the present disclosure. FIG. 3 shows a base station (BS) 310 (e.g., BS 110 depicted in FIGS. 1 and 2) and a UE 320 (e.g., a UE 120 depicted in FIGS. 1 and 2) that may communicate with each other.

BS 310 and UE 320 may have established a connection via a beam or link. UE 320 may be monitoring for a first reference signal (RS) 325. However, as shown by reference number 330, UE 320 may determine to switch from monitoring for first RS 325 to monitoring for a second RS 335. For example, UE 320 may detect that UE 320 is going out of coverage of first RS 325. UE 320 may determine that a beamforming gain of first RS 325 does not satisfy a gain threshold (e.g., minimum receive power), and, as shown by reference number 340, UE 320 may transmit a request to BS 310 that UE 320 switch from monitoring for first RS 325 to monitoring for second RS 335. The request may be in an RRC message, a MAC-CE, or uplink control information (UCI). In one example, UE 320 may evaluate whether a downlink radio link gain on a configured RLM-RS resource estimated over a last SSB evaluation period becomes worse than a gain threshold during the evaluation period. If a measurement is below the gain threshold, UE 320 may request to switch, for example, an RLM-RS from an SSB to a CSI-RS. In some aspects, UE 320 may evaluate whether a downlink radio link quality on a configured RLM-RS resource estimated over a last SSB evaluation period becomes worse than a quality threshold (e.g., minimum RSRQ, minimum signal to noise ratio (SNR), minimum signal to interference plus noise ratio (SINR)) during the evaluation period. If a measurement report for a configured RS resource is below the quality threshold, UE 320 may request to switch an RLM-RS from an SSB to a CSI-RS.

As shown by reference number 345, BS 310 may determine to switch from configuring UE 320 with first RS 325 to configuring UE 320 with second RS 335. For example, BS 310 may determine to switch from configuring UE 320 to monitor an SSB to configuring UE 320 to monitor a CSI-RS for RLM or BFD purposes. BS 310 may determine to switch reference signals based at least in part on the request from UE 320 and/or signaling feedback (e.g., sounding reference signal) or measurements (e.g., reference signal received power) of communications to and/or from UE 320. BS 310 may generate an indication that the request from UE 320 is granted and/or a configuration for UE 320 to switch. The configuration may, for example, instruct the UE to switch from monitoring for the SSB to monitoring for the CSI-RS. In some aspects, BS 310 may alter a pattern or frequency of transmitting the CSI-RS.

In some aspects, the configuration may specify one or more triggering conditions (e.g., thresholds, waiting period before switching) for UE 320 to switch from monitoring for one RS to monitoring for another RS. A configuration may specify one or more triggering conditions for UE 320 to switch back to monitoring for an original RS. A configuration may specify one or more conditions for selecting an RS to switch to from among multiple other RSs. In some aspects, a configuration may specify a new gain threshold and/or a new quality threshold.

As shown by reference number 350, BS 310 may transmit the indication or the configuration. In some aspects, BS 310 may continue to transmit first RS 325 (e.g., SSB) for other reasons, but BS 310 may still instruct UE 320 to monitor second RS 335 instead of first RS 325. BS 310 may transmit the indication or configuration in an RRC message, a MAC-CE, and/or downlink control information (DCI).

As shown by reference number 355, UE 320 may switch from monitoring for first RS 325 to monitoring for second RS 335, based at least in part on receiving the indication or the configuration from BS 310. When monitoring for first RS 325, UE 320 may receive second RS 335 or may not receive second RS 335 (and keep monitoring for first RS 325). UE 320 may tune signaling resources to a different time and/or frequency location to monitor second RS 335. UE 320 may start monitoring for second RS 335 before, at the same time, and/or after BS 310 starts transmitting second RS 335. UE 320 may have a separate gain threshold and/or a separate quality threshold for determining a link failure based at least in part on second RS 335. Second RS 335 (e.g., CSI-RS), being a narrower beam, may have a chance of not being directly focused at UE 320, and UE 320 may account for such possibilities. For example, if a gain of the CSI-RS has been sufficient but suddenly drops, UE 320 may wait a time before determining that the link has failed as a direction of the CSI-RS may have not been in a direction of UE 320. The direction of the CSI-RS may shortly come back to a direction of UE 320. In any event, UE 320 may have a better chance of maintaining a link to BS 310 if UE 320 switches reference signals when appropriate.

As indicated above, FIG. 3 is provided merely as an example. Other examples may differ from what is described with regard to FIG. 3.

Figure 4:
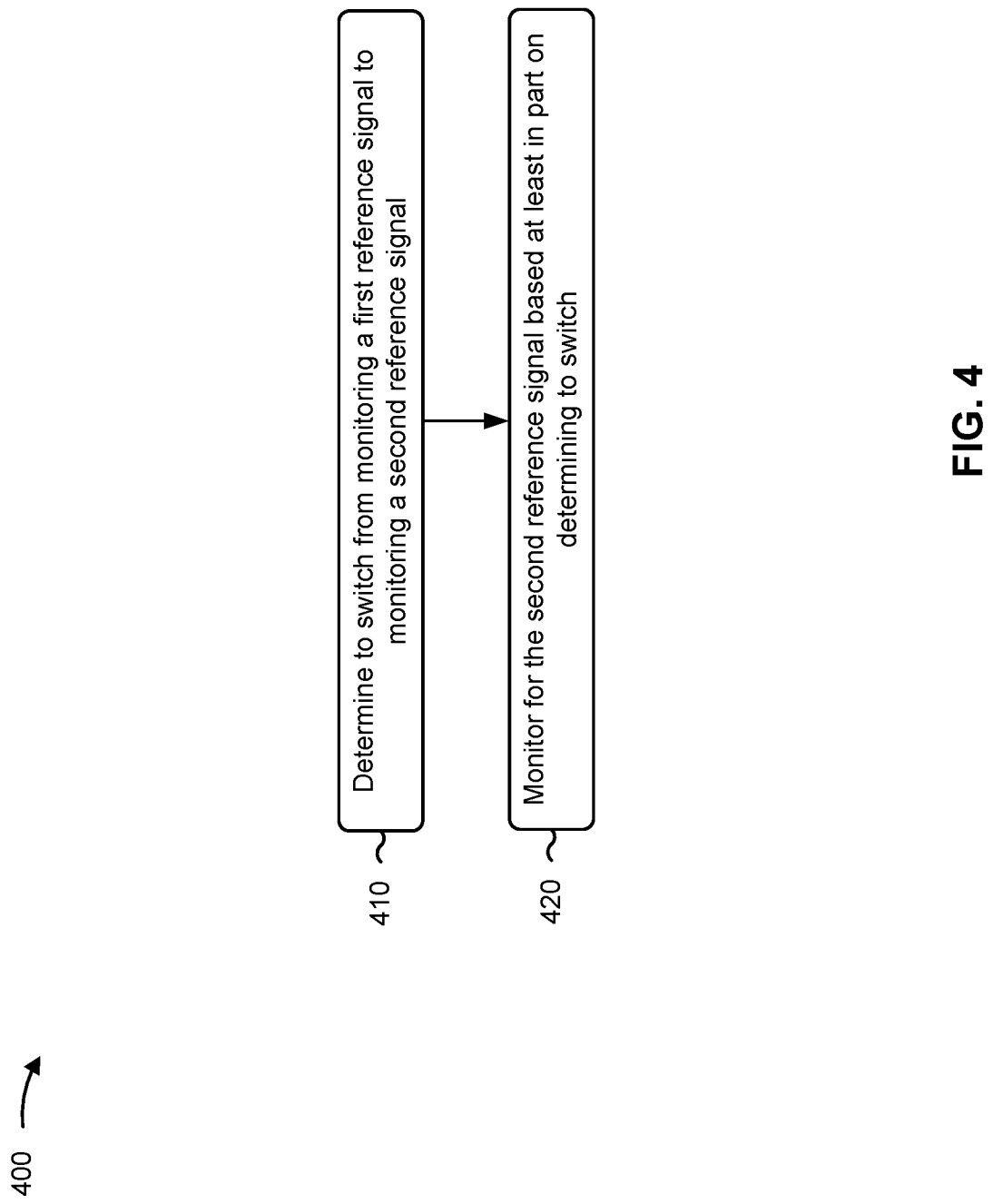
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., a UE 120 depicted in FIGS. 1 and 2, UE 320 depicted in FIG. 3) performs operations associated with switching reference signals for beam or link failure detection.

As shown in FIG. 4, in some aspects, process 400 may include determining to switch from monitoring a first reference signal to monitoring a second reference signal (block 410). For example, the UE (e.g., using receive processor 258, transmit processor 264, controller/processor 280, memory 282) may determine to switch from monitoring a first reference signal to monitoring a second reference signal, as described above.

As further shown in FIG. 4, in some aspects, process 400 may include monitoring for the second reference signal based at least in part on determining to switch (block 420). For example, the UE (e.g., using receive processor 258, transmit processor 264, controller/processor 280, memory 282) may monitor for the second reference signal based at least in part on determining to switch, as described above.

Process 400 may include additional aspects, such as any single aspect or any combination of aspects described below and/or in connection with one or more other processes described elsewhere herein.

In a first aspect, the first reference signal is a synchronization signal block, and the second reference signal is a channel state information reference signal. In some aspects, the first reference signal is an RLM reference signal or a BFD reference signal.

In a second aspect, alone or in combination with the first aspect, determining to switch includes receiving a message from a base station to switch from monitoring the first reference signal to monitoring the second reference signal.

In a third aspect, alone or in combination with one or more of the first and second aspects, the message is one of an RRC message, a MAC-CE, or DCI.

In a fourth aspect, alone or in combination with one or more of the first through third aspects, process 400 includes transmitting a request for a base station to switch from configuring the UE with the first reference signal to configuring the UE with the second reference signal based at least in part on a determination that a gain of the first reference signal does not satisfy a gain threshold.

In a fifth aspect, alone or in combination with one or more of the first through fourth aspects, the request is included in one of an RRC message, a MAC-CE, or UCI.

In a sixth aspect, alone or in combination with one or more of the first through fifth aspects, process 400 includes transmitting a request for a base station to switch from configuring the UE with the first reference signal to configuring the UE with the second reference signal based at least in part on a determination that a quality of the first reference signal does not satisfy a quality threshold.

In a seventh aspect, alone or in combination with one or more of the first through sixth aspects, process 400 includes receiving an indication from the base station to switch from monitoring the first reference signal to monitoring the second reference signal based at least in part on transmitting the request.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
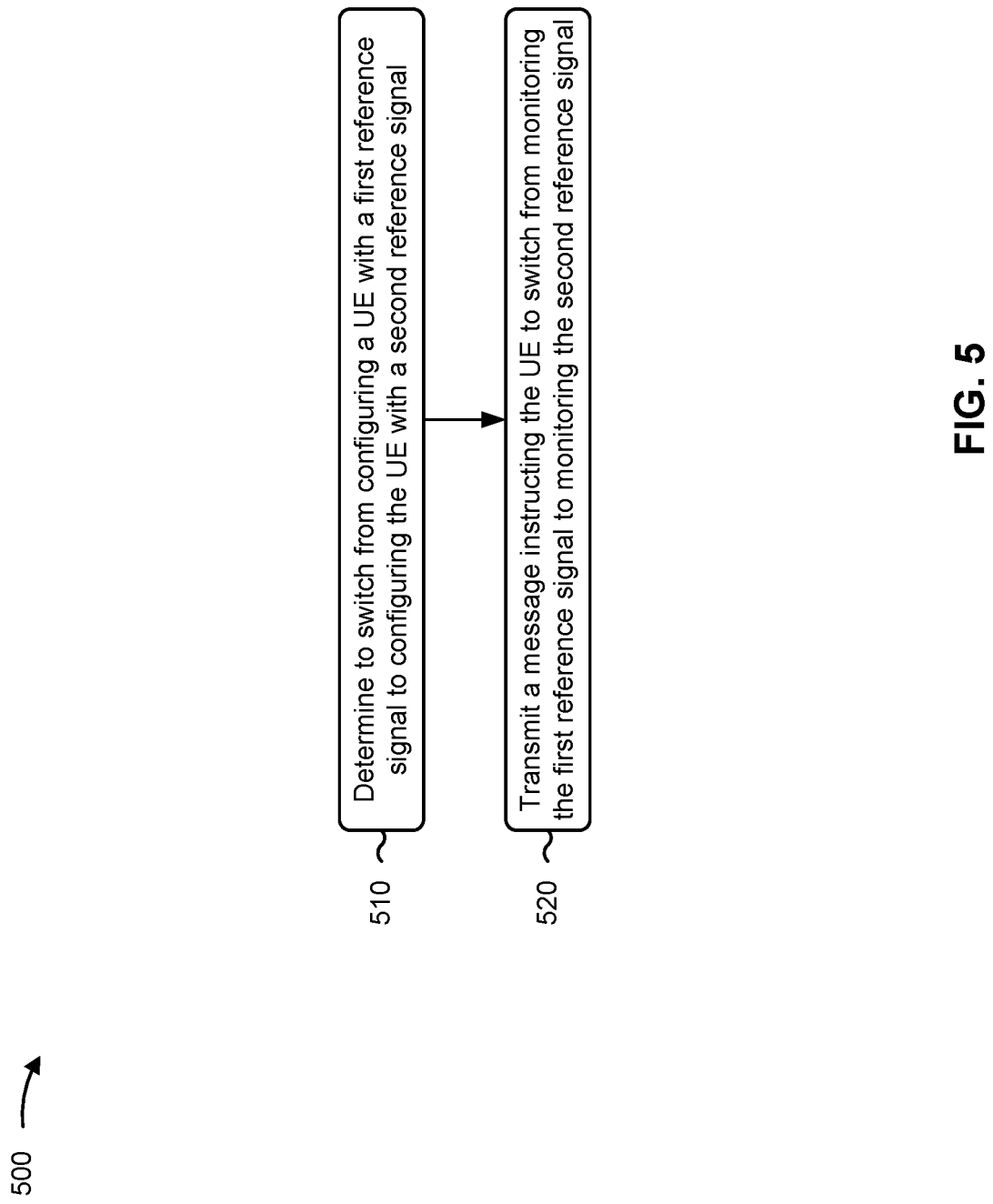
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., BS 110 depicted in FIGS. 1 and 2, BS 310 depicted in FIG. 3) performs operations associated with switching reference signals for beam or link failure detection.

As shown in FIG. 5, in some aspects, process 500 may include determining to switch from configuring a UE with a first reference signal to configuring the UE with a second reference signal (block 510). For example, the base station (e.g., using transmit processor 220, receive processor 238, controller/processor 240, memory 242) may determine to switch from transmitting a first reference signal to transmitting a second reference signal, as described above.

As further shown in FIG. 5, in some aspects, process 500 may include transmitting a message instructing the UE to switch from monitoring the first reference signal to monitoring the second reference signal (block 520). For example, the base station (e.g., using transmit processor 220, receive processor 238, controller/processor 240, memory 242) may transmit a message instructing the UE to switch from monitoring the first reference signal to monitoring the second reference signal, as described above.

Process 500 may include additional aspects, such as any single aspect or any combination of aspects described below and/or in connection with one or more other processes described elsewhere herein.

In a first aspect, the first reference signal is an SSB, and the second reference signal is a CSI-RS.

In a second aspect, alone or in combination with the first aspect, determining to switch includes determining to switch based at least in part on a determination that a gain of the first reference signal does not satisfy a gain threshold.

In a third aspect, alone or in combination with one or more of the first and second aspects, the message is one of an RRC message, a MAC-CE, or DCI.

In a fourth aspect, alone or in combination with one or more of the first through third aspects, determining to switch includes determining to switch based at least in part on a determination that a quality of the first reference signal does not satisfy a quality threshold.

In a fifth aspect, alone or in combination with one or more of the first through fourth aspects, determining to switch includes receiving a request from the UE for the base station to switch from configuring the UE with the first reference signal to configuring the UE with the second reference signal.

In a sixth aspect, alone or in combination with one or more of the first through fifth aspects, the request is included in one of an RRC message, a MAC-CE, or UCI.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
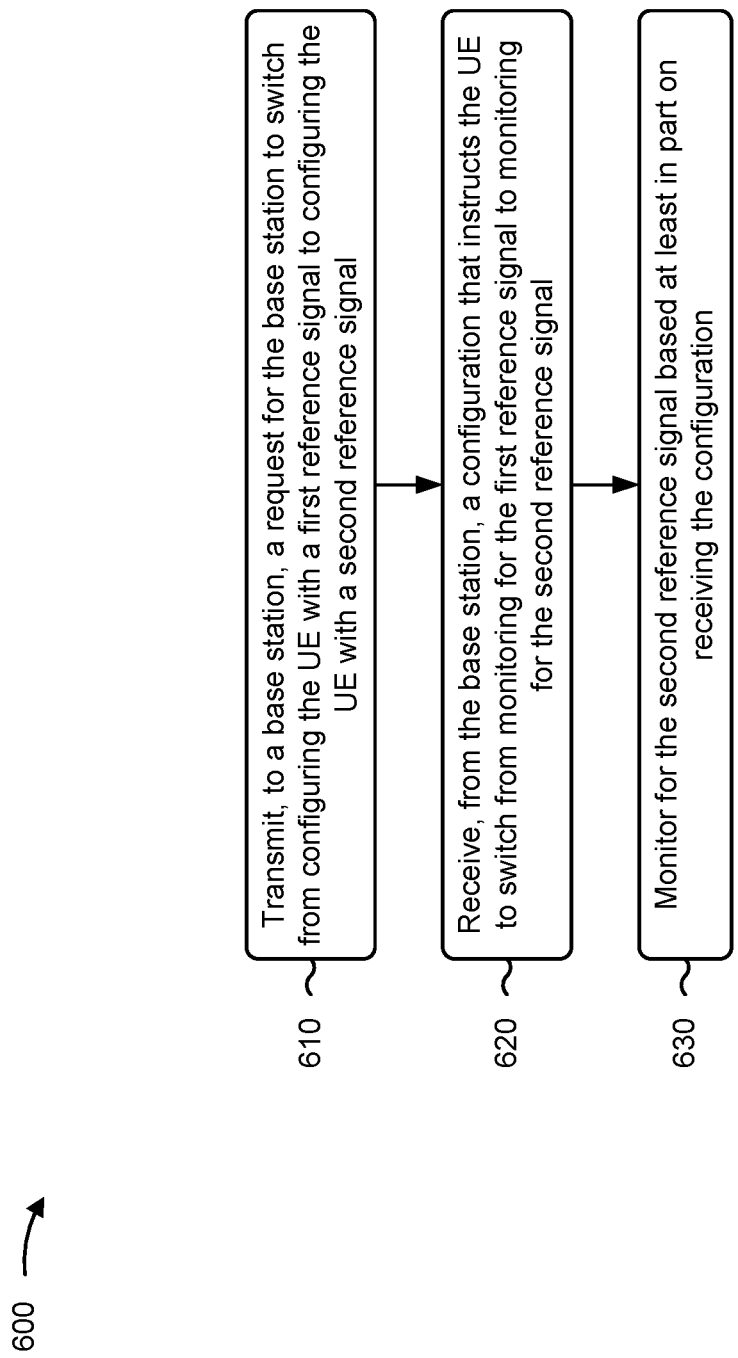
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., a UE 120 depicted in FIGS. 1 and 2, UE 320 depicted in FIG. 3) performs operations associated with switching reference signals for beam or link.

As shown in FIG. 6, in some aspects, process 600 may include transmitting, to a base station, a request for the base station to switch from configuring the UE with a first reference signal to configuring the UE with a second reference signal (block 610). For example, the UE (e.g., using receive processor 258, transmit processor 264, controller/processor 280, memory 282) may transmit, to a base station, a request for the base station to switch from configuring the UE with a first reference signal to configuring the UE with a second reference signal, as described above.

As further shown in FIG. 6, in some aspects, process 600 may include receiving, from the base station, a configuration to switch from monitoring for the first reference signal to monitoring for the second reference signal (block 620). For example, the UE (e.g., using receive processor 258, transmit processor 264, controller/processor 280, memory 282) may receive, from the base station, a configuration to switch from monitoring for the first reference signal to monitoring for the second reference signal, as described above.

As further shown in FIG. 6, in some aspects, process 600 may include monitoring for the second reference signal based at least in part on receiving the configuration (block 630). For example, the UE (e.g., using receive processor 258, transmit processor 264, controller/processor 280, memory 282) may monitor for the second reference signal based at least in part on receiving the configuration, as described above.

Process 600 may include additional aspects, such as any single aspect or any combination of aspects described below and/or in connection with one or more other processes described elsewhere herein.

In a first aspect, the monitoring includes receiving the second reference signal.

In a second aspect, alone or in combination with the first aspect, the first reference signal is one of an RLM reference signal or a BFD reference signal.

In a third aspect, alone or in combination with one or more of the first and second aspects, the first reference signal is an SSB, and the second reference signal is a CSI-RS.

In a fourth aspect, alone or in combination with one or more of the first through third aspects, the configuration is received in an RRC message, a MAC-CE, or DCI.

In a fifth aspect, alone or in combination with one or more of the first through fourth aspects, the request is transmitted if a gain of the first reference signal does not satisfy a gain threshold.

In a sixth aspect, alone or in combination with one or more of the first through fifth aspects, the request is transmitted if a quality of the first reference signal does not satisfy a quality threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
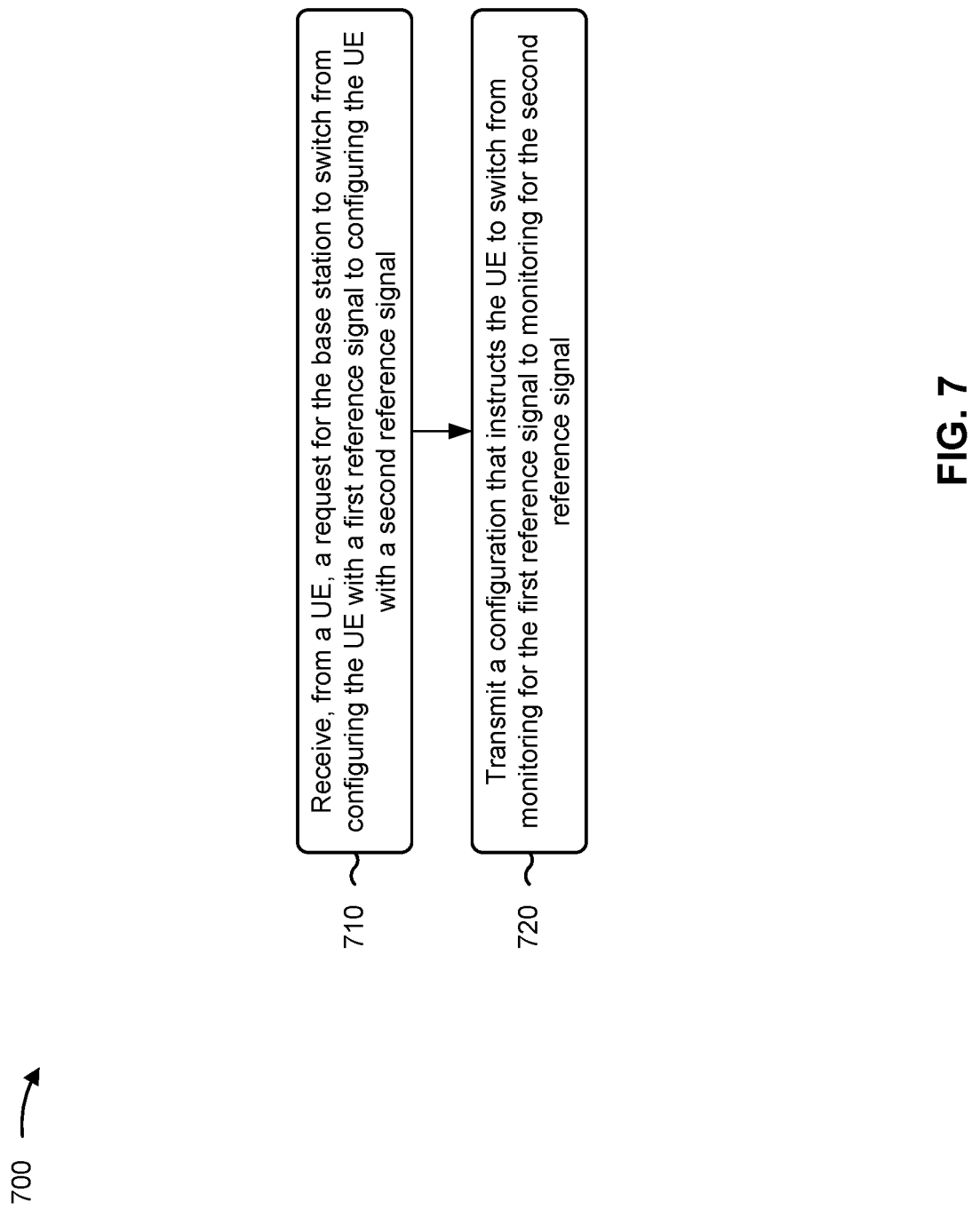
FIG. 7 is a diagram illustrating an example process performed, for example, by a base station, in accordance with the present disclosure

FIG. 7 is a diagram illustrating an example process 700 performed, for example, by a base station, in accordance with the present disclosure. Example process 700 is an example where the base station (e.g., BS 110 depicted in FIGS. 1 and 2, BS 310 depicted in FIG. 3) performs operations associated with switching reference signals for beam or link.

As shown in FIG. 7, in some aspects, process 700 may include receiving, from a UE, a request for the base station to switch from configuring the UE with a first reference signal to configuring the UE with a second reference signal (block 710). For example, the base station (e.g., using transmit processor 220, receive processor 238, controller/processor 240, memory 242) may receive, from a UE, a request for the base station to switch from configuring the UE with a first reference signal to configuring the UE with a second reference signal, as described above.

As further shown in FIG. 7, in some aspects, process 700 may include transmitting a configuration to switch from monitoring for the first reference signal to monitoring for the second reference signal (block 720). For example, the base station (e.g., using transmit processor 220, receive processor 238, controller/processor 240, memory 242) may transmit a configuration to switch from monitoring for the first reference signal to monitoring for the second reference signal, as described above.

Process 700 may include additional aspects, such as any single aspect or any combination of aspects described below and/or in connection with one or more other processes described elsewhere herein.

In a first aspect, the first reference signal is an SSB, and the second reference signal is a CSI-RS.

In a second aspect, alone or in combination with the first aspect, the configuration is transmitted if a gain of the first reference signal does not satisfy a gain threshold.

In a third aspect, alone or in combination with one or more of the first and second aspects, the configuration is transmitted in an RRC message, a MAC-CE, or DCI.

In a fourth aspect, alone or in combination with one or more of the first through third aspects, the configuration is transmitted if a quality of the first reference signal does not satisfy a quality threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
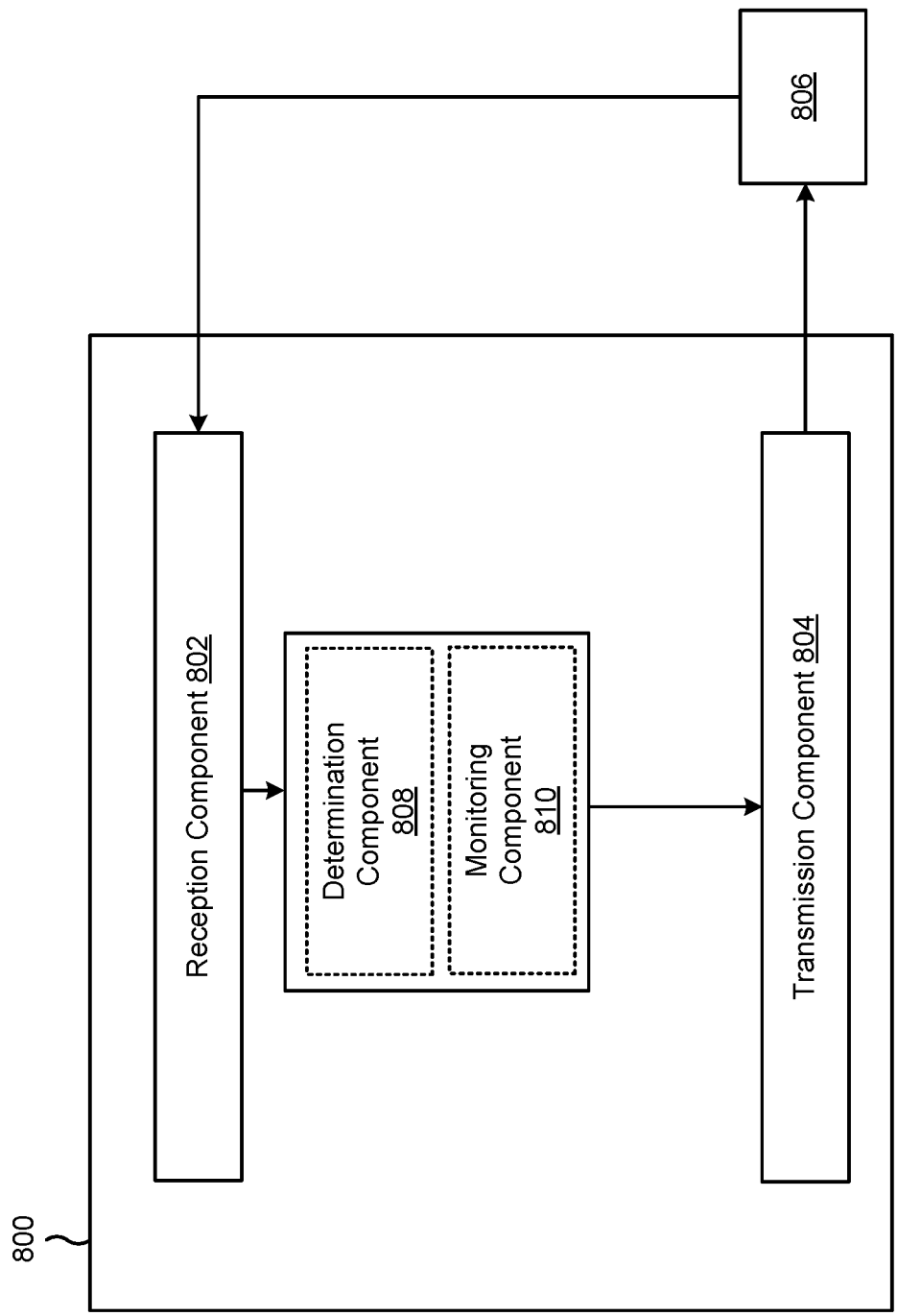
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include apparatus 800. In some aspects, apparatus 800 includes a reception component 802 and a transmission component 804, which may be in communication with one another (for example, via one or more buses and/or one or more other components). As shown, apparatus 800 may communicate with another apparatus 806 (such as a UE (e.g., UE 120e, among other examples), a base station (e.g., BS 110a, BS 110d, among other examples), or another wireless communication device) using reception component 802 and transmission component 804. As further shown, apparatus 800 may include a determination component 808 and/or monitoring component 810, among other examples.

In some aspects, apparatus 800 may be configured to perform one or more operations described herein in connection with FIGS. 1-3. Additionally, or alternatively, apparatus 800 may be configured to perform one or more processes described herein, such as process 400 of FIG. 4, process 600 of FIG. 6, or a combination thereof. In some aspects, apparatus 800 and/or one or more components shown in FIG. 8 may include one or more components of the network node described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

Reception component 802 may receive communications, such as reference signals, control information, data communications, or a combination thereof, from apparatus 806. Reception component 802 may provide received communications to one or more other components of apparatus 800. In some aspects, reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of apparatus 806. In some aspects, reception component 802 may include one or more antennas, a demodulator, a MIMO detector, a receive processor, a controller/processor, a memory, or a combination thereof, of the network node described above in connection with FIG. 2.

Transmission component 804 may transmit communications, such as reference signals, control information, data communications, or a combination thereof, to apparatus 806. In some aspects, one or more other components of apparatus 806 may generate communications and may provide the generated communications to transmission component 804 for transmission to apparatus 806. In some aspects, transmission component 804 may perform signal processing on the generated communications (such as filtering, amplification, modulation, digital-to-analog conversion, multiplexing, interleaving, mapping, or encoding, among other examples), and may transmit the processed signals to apparatus 806. In some aspects, transmission component 804 may include one or more antennas, a modulator, a transmit MIMO processor, a transmit processor, a controller/processor, a memory, or a combination thereof, of the network node described above in connection with FIG. 2. In some aspects, transmission component 804 may be co-located with reception component 802 in a transceiver.

Determination component 808 may determine to switch from monitoring a first reference signal to monitoring a second reference signal. Monitoring component 810 may monitor for the second reference signal based at least in part on determining to switch.

Transmission component 804 may transmit, to a base station, a request for the base station to switch from configuring the UE with a first reference signal to configuring the UE with a second reference signal. Reception component 802 may receive, from the base station, a configuration to switch from monitoring for the first reference signal to monitoring for the second reference signal. Monitoring component 810 may monitor for the second reference signal based at least in part on receiving the configuration.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
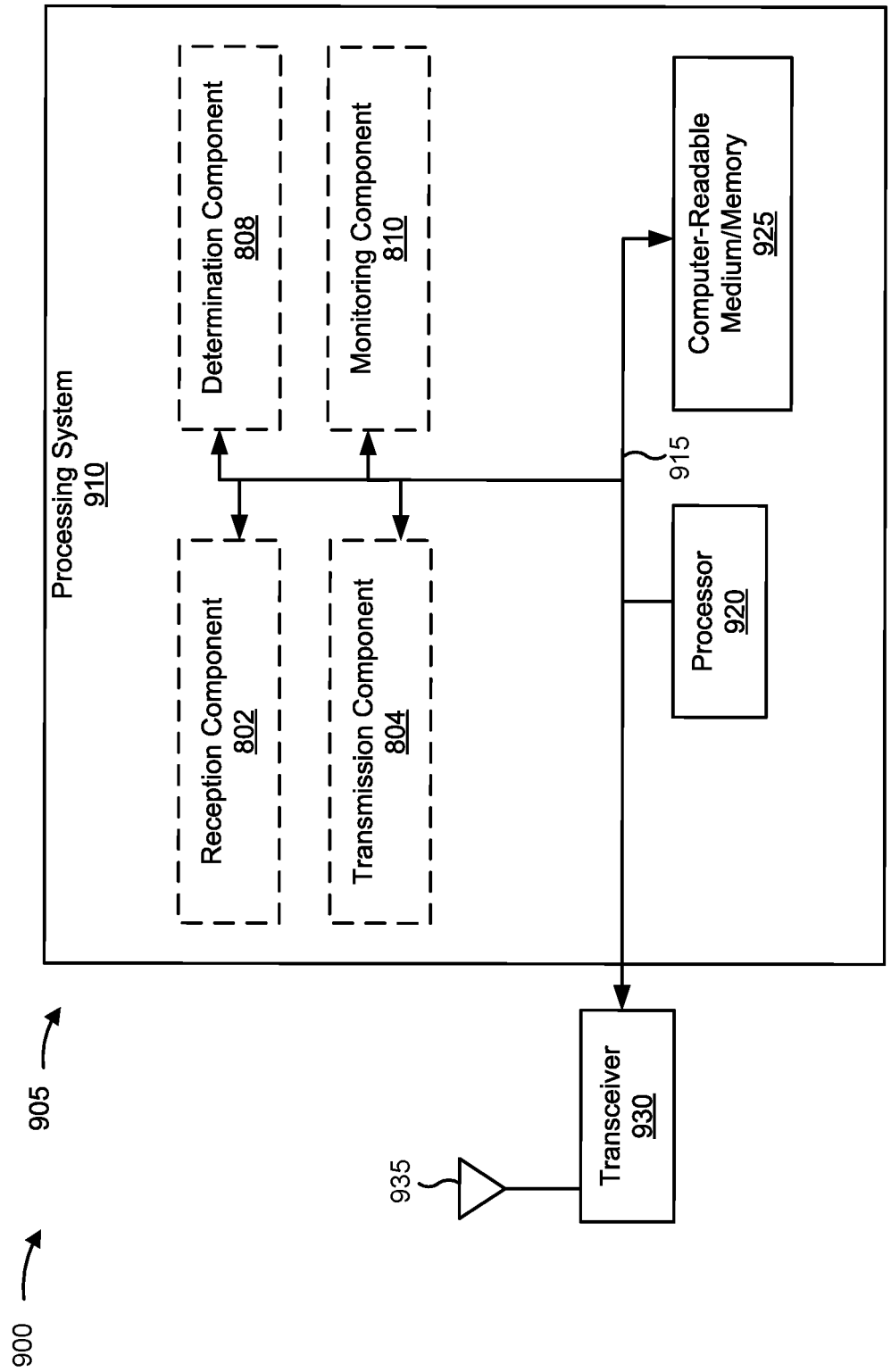
FIG. 9 is a diagram illustrating an example of a hardware implementation for an apparatus employing a processing system, in accordance with the present disclosure.

FIG. 9 is a diagram illustrating an example 900 of a hardware implementation for an apparatus 905 employing a processing system 910. Apparatus 905 may be a UE.

Processing system 910 may be implemented with a bus architecture, represented generally by bus 915. Bus 915 may include any number of interconnecting buses and bridges depending on the specific application of processing system 910 and the overall design constraints. Bus 915 links together various circuits including one or more processors and/or hardware components, represented by processor 920, the illustrated components, and computer-readable medium/memory 925. Bus 915 may also link various other circuits, such as timing sources, peripherals, voltage regulators, and/or power management circuits.

Processing system 910 may be coupled to a transceiver 930. Transceiver 930 is coupled to one or more antennas 935. Transceiver 930 provides a means for communicating with various other apparatuses over a transmission medium. Transceiver 930 receives a signal from the one or more antennas 935, extracts information from the received signal, and provides the extracted information to processing system 910, specifically reception component 802. In addition, transceiver 930 receives information from processing system 910, specifically transmission component 804, and generates a signal to be applied to one or more antennas 935 based at least in part on the received information.

Processing system 910 includes a processor 920 coupled to a computer-readable medium/memory 925. Processor 920 is responsible for general processing, including the execution of software stored on computer-readable medium/memory 925. The software, when executed by processor 920, causes processing system 910 to perform the various functions described herein for any particular apparatus. Computer-readable medium/memory 925 may also be used for storing data that is manipulated by processor 920 when executing software. Processing system 910 further includes at least one of the illustrated components. The components may be software modules running in processor 920, resident/stored in computer readable medium/memory 925, one or more hardware modules coupled to processor 920, or some combination thereof.

In some aspects, processing system 910 may be a component of base station 110 (e.g., BS 110a, BS 110d, among other examples) and may include the memory 242 and/or at least one of TX MIMO processor 230, RX processor 238, and/or controller/processor 240. In some aspects, processing system 910 may be a component of UE 120 (e.g., UE 120e among other examples) and may include controller/processor 280, TX processor 264, TX MIMO processor 266, and/or RX processor 258. In some aspects, apparatus 905 for wireless communication includes means for determining to switch from monitoring a first reference signal to monitoring a second reference signal, and/or means for monitoring for the second reference signal based at least in part on determining to switch. In some aspects, apparatus 905 may include means for transmitting, to a base station, a request for the base station to switch from configuring the UE with a first reference signal to configuring the UE with a second reference signal, means for receiving, from the base station, a configuration to switch from monitoring for the first reference signal to monitoring for the second reference signal, and/or means for monitoring for the second reference signal based at least in part on receiving the configuration. The aforementioned means may be one or more of the aforementioned components of apparatus 800 and/or the processing system 910 of apparatus 905 configured to perform the functions recited by the aforementioned means. As described elsewhere herein, processing system 910 may include TX MIMO processor 230, receive processor 238, and/or controller/processor 240. In one configuration, the aforementioned means may be TX MIMO processor 230, receive processor 238, and/or the controller/processor 240 configured to perform the functions and/or operations recited herein.

FIG. 9 is provided as an example. Other examples may differ from what is described in connection with FIG. 9.

Figure 10:
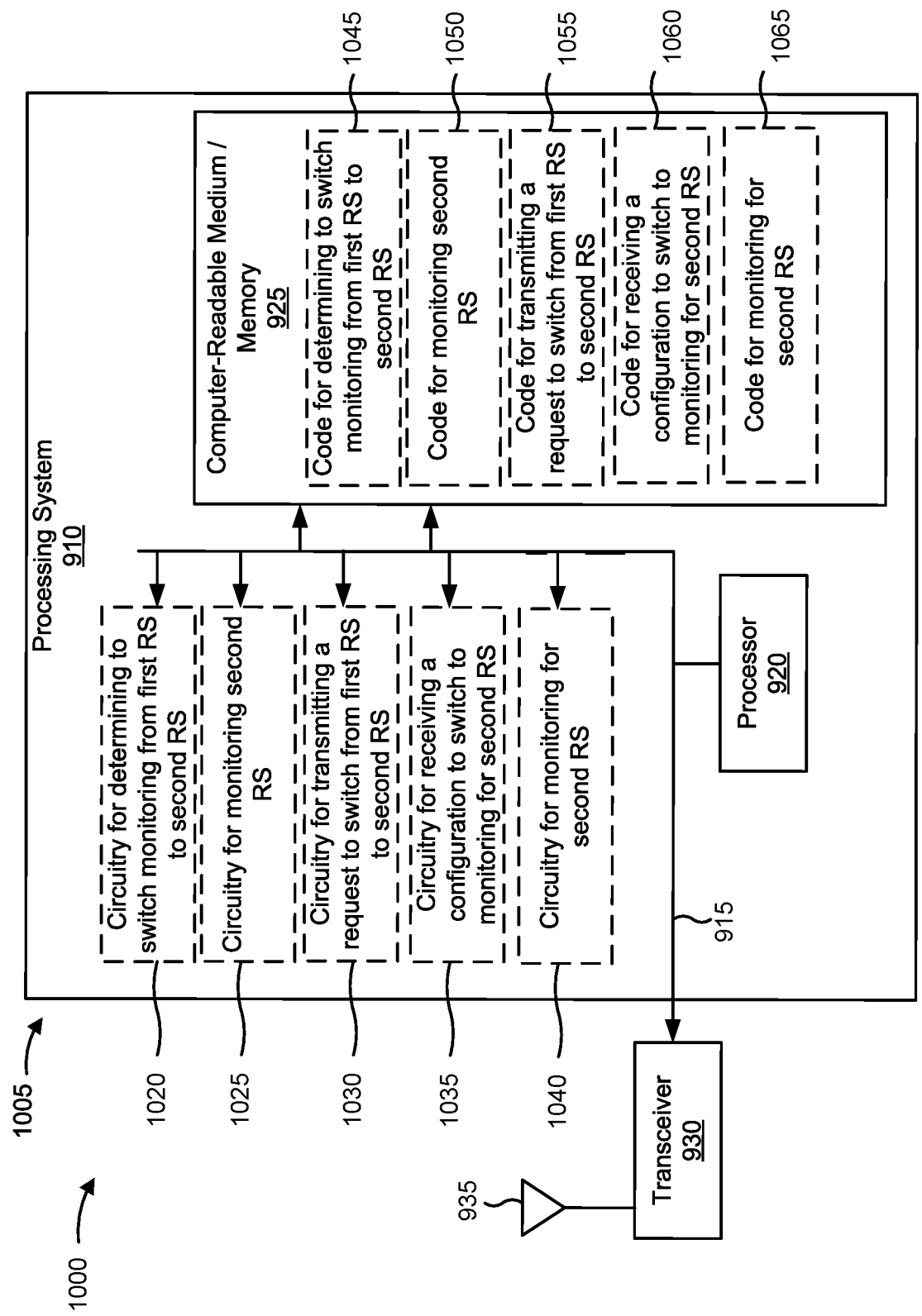
FIG. 10 is a diagram illustrating an example of an implementation of code and circuitry for an apparatus, in accordance with the present disclosure.

FIG. 10 is a diagram illustrating an example 1000 of an implementation of code and circuitry for an apparatus 1005. Apparatus 1005 may be a UE.

As further shown in FIG. 10, the apparatus may include circuitry for determining to switch from monitoring a first reference signal to monitoring a second reference signal (circuitry 1020). For example, the apparatus may include circuitry to enable the apparatus to determine to switch from monitoring a first reference signal to monitoring a second reference signal.

As further shown in FIG. 10, the apparatus may include circuitry for monitoring for the second reference signal based at least in part on determining to switch (circuitry 1025). For example, the apparatus may include circuitry to enable the apparatus to monitor for the second reference signal based at least in part on determining to switch.

As further shown in FIG. 10, the apparatus may include circuitry for transmitting, to a base station, a request for the base station to switch from configuring the UE with a first reference signal to configuring the UE with a second reference signal (circuitry 1030). For example, the apparatus may include circuitry to enable the apparatus to transmit, to a base station, a request for the base station to switch from configuring the UE with a first reference signal to configuring the UE with a second reference signal.

As further shown in FIG. 10, the apparatus may include circuitry for receiving, from the base station, a configuration to switch from monitoring for the first reference signal to monitoring for the second reference signal (circuitry 1035). For example, the apparatus may include circuitry to enable the apparatus to receive, from the base station, a configuration to switch from monitoring for the first reference signal to monitoring for the second reference signal.

As further shown in FIG. 10, the apparatus may include circuitry for monitoring for the second reference signal based at least in part on receiving the configuration (circuitry 1040). For example, the apparatus may include circuitry to enable the apparatus to monitor for the second reference signal based at least in part on receiving the configuration.

As further shown in FIG. 10, the apparatus may include, stored in computer-readable medium 925, code for determining to switch from monitoring a first reference signal to monitoring a second reference signal (code 1045). For example, the apparatus may include code that, when executed by processor 920, may cause processor 920 to determine to switch from monitoring a first reference signal to monitoring a second reference signal.

As further shown in FIG. 10, the apparatus may include, stored in computer-readable medium 925, code for monitoring for the second reference signal based at least in part on determining to switch (code 1050). For example, the apparatus may include code that, when executed by processor 920, may cause processor 920 to cause transceiver 930 to monitor for the second reference signal based at least in part on determining to switch.

As further shown in FIG. 10, the apparatus may include, stored in computer-readable medium 925, code for transmitting, to a base station, a request for the base station to switch from configuring the UE with a first reference signal to configuring the UE with a second reference signal (code 1055). For example, the apparatus may include code that, when executed by processor 920, may cause processor 920 to cause transceiver 930 to transmit, to a base station, a request for the base station to switch from configuring the UE with a first reference signal to configuring the UE with a second reference signal.

As further shown in FIG. 10, the apparatus may include, stored in computer-readable medium 925, code for receiving, from the base station, a configuration to switch from monitoring for the first reference signal to monitoring for the second reference signal (code 1060). For example, the apparatus may include code that, when executed by processor 920, may cause processor 920 to cause transceiver 930 to receive, from the base station, a configuration to switch from monitoring for the first reference signal to monitoring for the second reference signal.

As further shown in FIG. 10, the apparatus may include, stored in computer-readable medium 925, code for monitoring for the second reference signal based at least in part on receiving the configuration (code 1065). For example, the apparatus may include code that, when executed by processor 920, may cause processor 920 to cause transceiver 930 to monitor for the second reference signal based at least in part on receiving the configuration.

FIG. 10 is provided as an example. Other examples may differ from what is described in connection with FIG. 10.

Figure 11:
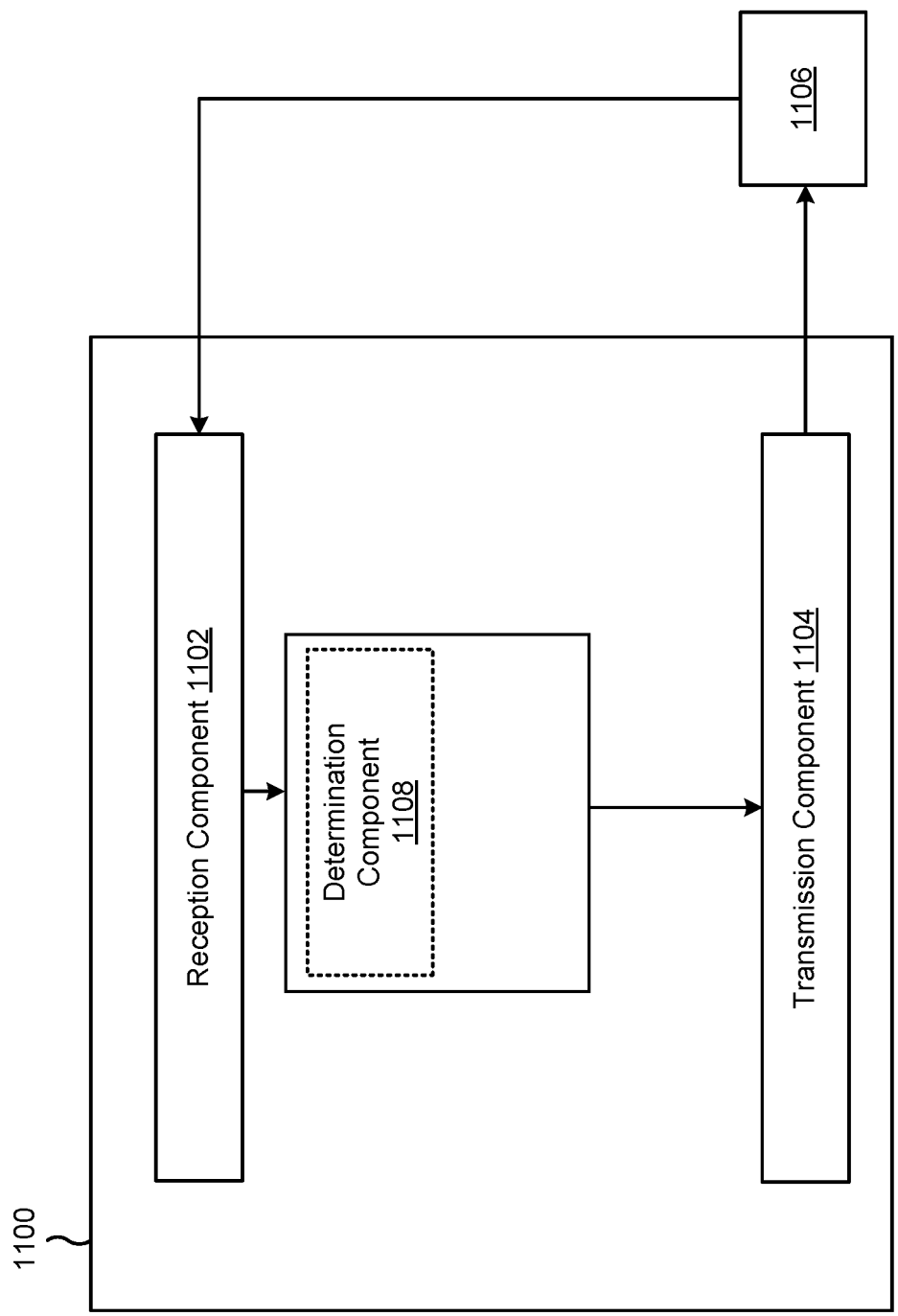
FIG. 11 is a block diagram of an example apparatus for wireless communication, in accordance with the present disclosure.

FIG. 11 is a block diagram of an example apparatus 1100 for wireless communication. The apparatus 1100 may be a base station, or a base station may include apparatus 1100. In some aspects, apparatus 1100 includes a reception component 1102 and a transmission component 1104, which may be in communication with one another (for example, via one or more buses and/or one or more other components). As shown, apparatus 1100 may communicate with another apparatus 1106 (such as a UE (e.g., UE 120e, among other examples), a base station (e.g., BS 110a, BS 110d, among other examples), or another wireless communication device) using reception component 1102 and transmission component 1104. As further shown, apparatus 1100 may include a determination component 1108, among other examples.

In some aspects, apparatus 1100 may be configured to perform one or more operations described herein in connection with FIGS. 1-3. Additionally, or alternatively, apparatus 1100 may be configured to perform one or more processes described herein, such as process 500 of FIG. 5, process 700 of FIG. 7, or a combination thereof. In some aspects, apparatus 1100 and/or one or more components shown in FIG. 11 may include one or more components of the network node described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

Reception component 1102 may receive communications, such as reference signals, control information, data communications, or a combination thereof, from apparatus 1106. Reception component 1102 may provide received communications to one or more other components of apparatus 1100. In some aspects, reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of apparatus 1106. In some aspects, reception component 1102 may include one or more antennas, a demodulator, a MIMO detector, a receive processor, a controller/processor, a memory, or a combination thereof, of the network node described above in connection with FIG. 2.

Transmission component 1104 may transmit communications, such as reference signals, control information, data communications, or a combination thereof, to apparatus 1106. In some aspects, one or more other components of apparatus 1106 may generate communications and may provide the generated communications to transmission component 1104 for transmission to apparatus 1106. In some aspects, transmission component 1104 may perform signal processing on the generated communications (such as filtering, amplification, modulation, digital-to-analog conversion, multiplexing, interleaving, mapping, or encoding, among other examples), and may transmit the processed signals to apparatus 1106. In some aspects, transmission component 1104 may include one or more antennas, a modulator, a transmit MIMO processor, a transmit processor, a controller/processor, a memory, or a combination thereof, of the network node described above in connection with FIG. 2. In some aspects, transmission component 1104 may be co-located with reception component 1102 in a transceiver.

Determination component 1108 may determine to switch from configuring a UE with a first reference signal to configuring the UE with a second reference signal. Transmission component 1104 may transmit a message instructing the UE to switch from monitoring for the first reference signal to monitoring for the second reference signal.

Reception component 1102 may receive, from a UE, a request for the base station to switch from configuring the UE with a first reference signal to configuring the UE with a second reference signal. Determination component 1108 may determine whether to switch the UE from monitoring for the first RS to the second RS based at least in part on traffic conditions. Transmission component 1104 may transmit a configuration to switch from monitoring for the first reference signal to monitoring for the second reference signal.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
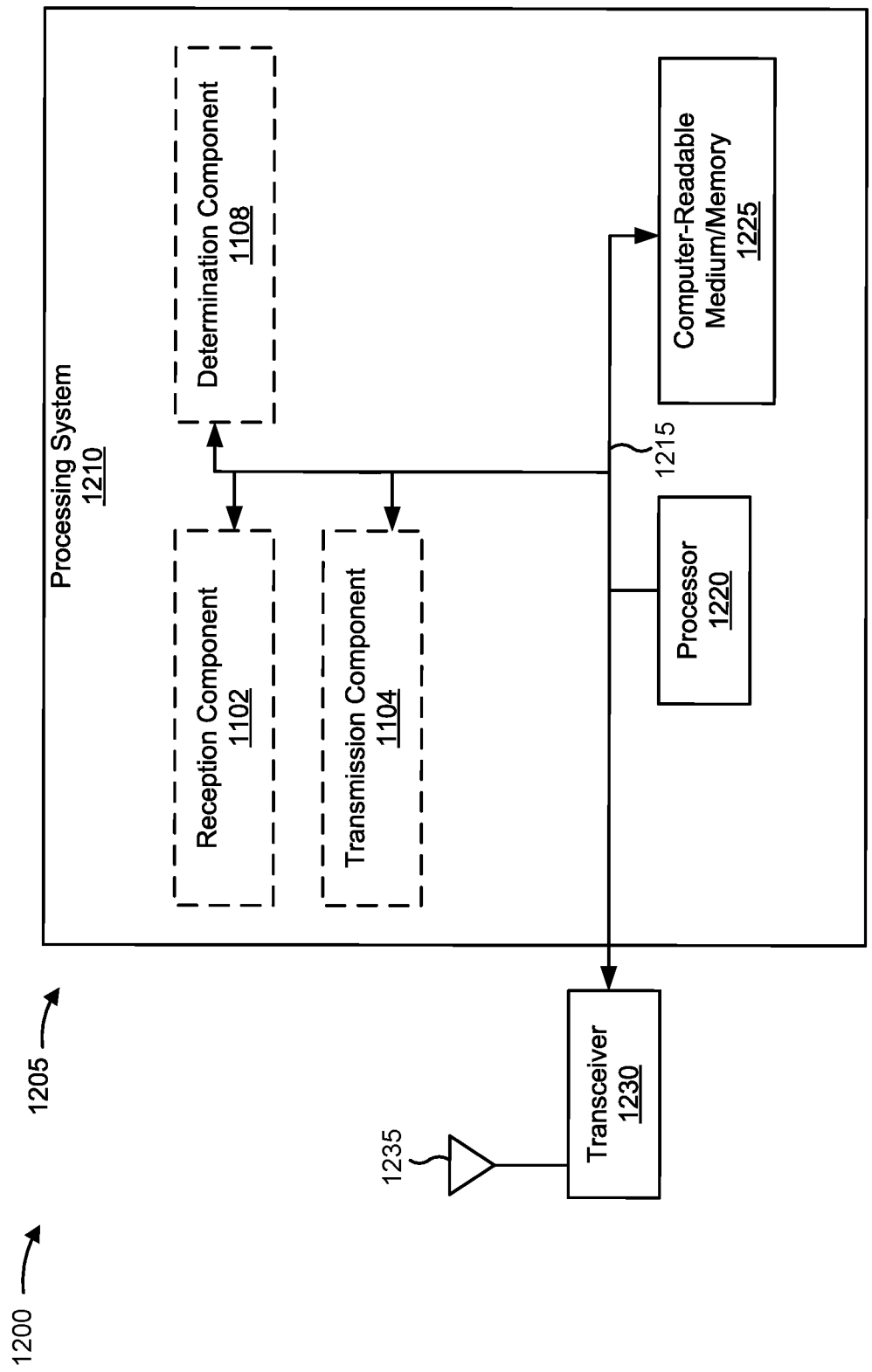
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210. Apparatus 1205 may be a base station.

Processing system 1210 may be implemented with a bus architecture, represented generally by bus 1215. Bus 1215 may include any number of interconnecting buses and bridges depending on the specific application of processing system 1210 and the overall design constraints. Bus 1215 links together various circuits including one or more processors and/or hardware components, represented by processor 1220, the illustrated components, and computer-readable medium/memory 1225. Bus 1215 may also link various other circuits, such as timing sources, peripherals, voltage regulators, power management circuits, and/or the like.

Processing system 1210 may be coupled to a transceiver 1230. Transceiver 1230 is coupled to one or more antennas 1235. Transceiver 1230 provides a means for communicating with various other apparatuses over a transmission medium. Transceiver 1230 receives a signal from the one or more antennas 1235, extracts information from the received signal, and provides the extracted information to processing system 1210, specifically reception component 1102. In addition, transceiver 1230 receives information from processing system 1210, specifically transmission component 1104, and generates a signal to be applied to one or more antennas 1235 based at least in part on the received information.

Processing system 1210 includes a processor 1220 coupled to a computer-readable medium/memory 1225. Processor 1220 is responsible for general processing, including the execution of software stored on computer-readable medium/memory 1225. The software, when executed by processor 1220, causes processing system 1210 to perform the various functions described herein for any particular apparatus. Computer-readable medium/memory 1225 may also be used for storing data that is manipulated by processor 1220 when executing software. Processing system 1210 further includes at least one of the illustrated components. The components may be software modules running in processor 1220, resident/stored in computer readable medium/memory 1225, one or more hardware modules coupled to processor 1220, or some combination thereof.

In some aspects, processing system 1210 may be a component of base station 110 (e.g., BS 110a, BS 110d, among other examples) and may include the memory 242 and/or at least one of TX MIMO processor 230, RX processor 238, and/or controller/processor 240. In some aspects, processing system 1210 may be a component of UE 120 (e.g., UE 120e among other examples) and may include controller/processor 280, TX processor 264, TX MIMO processor 266, and/or RX processor 258. In some aspects, apparatus 1205 for wireless communication includes means determining to switch from configuring a UE with a first reference signal to configuring the UE with a second reference signal, and/or means for transmitting a message instructing the UE to switch from monitoring the first reference signal to monitoring the second reference signal, among other examples. In some aspects, apparatus 1205 may include means for receiving, from a UE, a request for the base station to switch from configuring the UE with a first reference signal to configuring the UE with a second reference signal, and/or means for transmitting a configuration to switch from monitoring for the first reference signal to monitoring for the second reference signal, among other examples. The aforementioned means may be one or more of the aforementioned components of apparatus 1100 and/or the processing system 1210 of apparatus 1205 configured to perform the functions recited by the aforementioned means. As described elsewhere herein, processing system 1210 may include TX MIMO processor 230, receive processor 238, and/or controller/processor 240. In one configuration, the aforementioned means may be TX MIMO processor 230, receive processor 238, and/or the controller/processor 240 configured to perform the functions and/or operations recited herein.

FIG. 12 is provided as an example. Other examples may differ from what is described in connection with FIG. 12.

Figure 13:
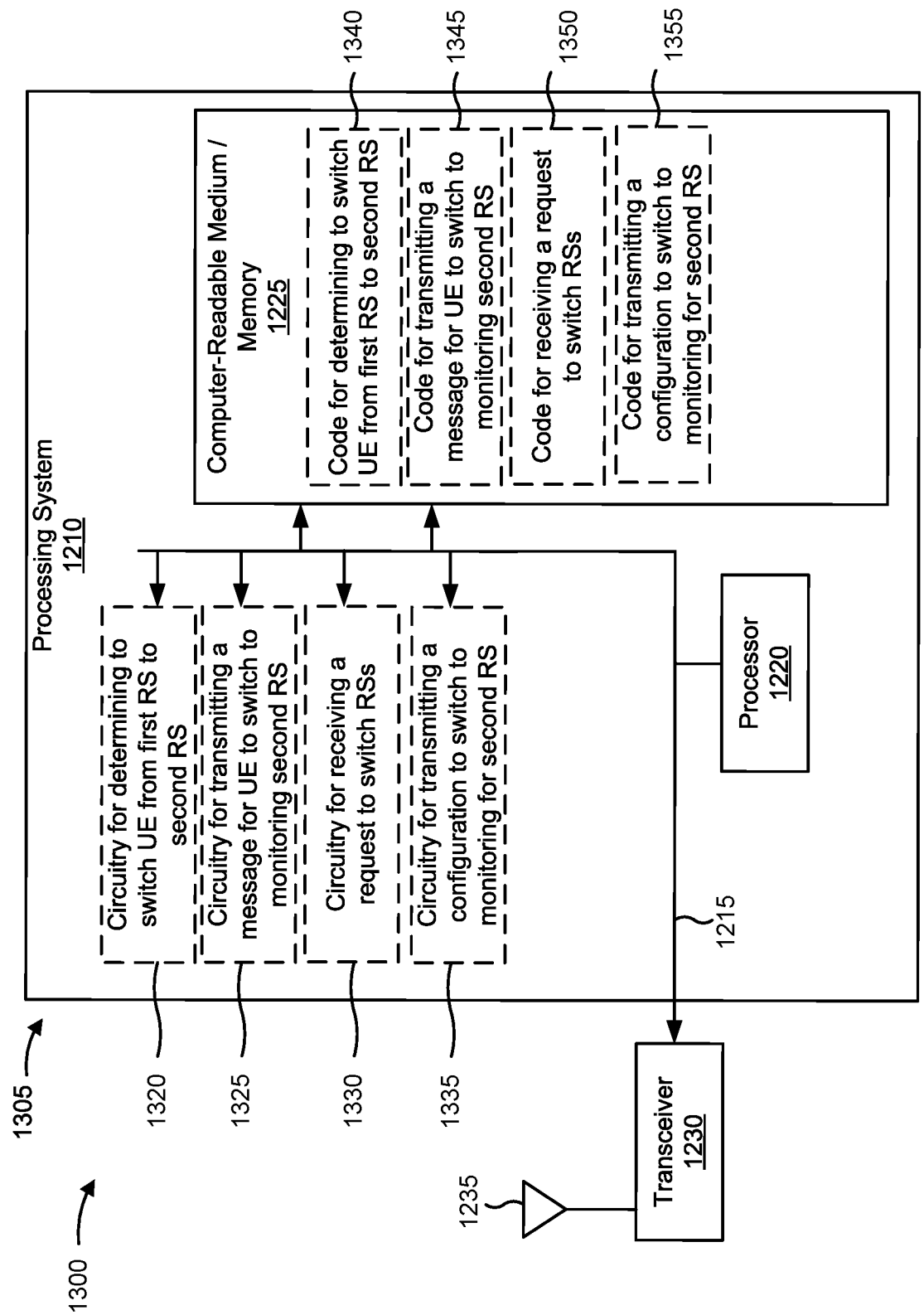
FIG. 13 is a diagram illustrating an example of an implementation of code and circuitry for an apparatus, in accordance with the present disclosure.

FIG. 13 is a diagram illustrating an example 1300 of an implementation of code and circuitry for an apparatus 1305. Apparatus 1305 may be a base station.

As further shown in FIG. 13, the apparatus may include circuitry for determining to switch from configuring a UE with a first reference signal to configuring the UE with a second reference signal (circuitry 1320). For example, the apparatus may include circuitry to enable the apparatus to determine to switch from configuring a UE with a first reference signal to configuring the UE with a second reference signal.

As further shown in FIG. 13, the apparatus may include circuitry for transmitting a message instructing the UE to switch from monitoring the first reference signal to monitoring the second reference signal (circuitry 1325). For example, the apparatus may include circuitry to enable the apparatus to transmit a message instructing the UE to switch from monitoring the first reference signal to monitoring the second reference signal.

As further shown in FIG. 13, the apparatus may include circuitry for receiving, from a UE, a request for the base station to switch from configuring the UE with a first reference signal to configuring the UE with a second reference signal (circuitry 1330). For example, the apparatus may include circuitry to enable the apparatus to receive, from a UE, a request for the base station to switch from configuring the UE with a first reference signal to configuring the UE with a second reference signal.

As further shown in FIG. 13, the apparatus may include circuitry for transmitting a configuration to switch from monitoring for the first reference signal to monitoring for the second reference signal (circuitry 1335). For example, the apparatus may include circuitry to enable the apparatus to transmit a configuration to switch from monitoring for the first reference signal to monitoring for the second reference signal.

As further shown in FIG. 13, the apparatus may include, stored in computer-readable medium 1225, code for determining to switch from configuring a UE with a first reference signal to configuring the UE with a second reference signal (code 1340). For example, the apparatus may include code that, when executed by the processor 1220, may cause processor 1220 to determine to switch from configuring a UE with a first reference signal to configuring the UE with a second reference signal.

As further shown in FIG. 13, the apparatus may include, stored in computer-readable medium 1225, code for transmitting a message instructing the UE to switch from monitoring for the first reference signal to monitoring for the second reference signal (code 1345). For example, the apparatus may include code that, when executed by processor 1220, may cause processor 1220 to cause transceiver 1230 to transmit a message instructing the UE to switch from monitoring for the first reference signal to monitoring for the second reference signal.

As further shown in FIG. 13, the apparatus may include, stored in computer-readable medium 1225, code for receiving, from a UE, a request for the base station to switch from configuring the UE with a first reference signal to configuring the UE with a second reference signal (code 1350). For example, the apparatus may include code that, when executed by processor 1220, may cause processor 1220 to cause transceiver 1230 to receive, from a UE, a request for the base station to switch from configuring the UE with a first reference signal to configuring the UE with a second reference signal.

As further shown in FIG. 13, the apparatus may include, stored in computer-readable medium 1225, code for transmitting a configuration to switch from monitoring for the first reference signal to monitoring for the second reference signal (code 1355). For example, the apparatus may include code that, when executed by processor 1220, may cause processor 1220 to cause transceiver 1230 to transmit a configuration to switch from monitoring for the first reference signal to monitoring for the second reference signal.

FIG. 13 is provided as an example. Other examples may differ from what is described in connection with FIG. 13.

Figure 14:
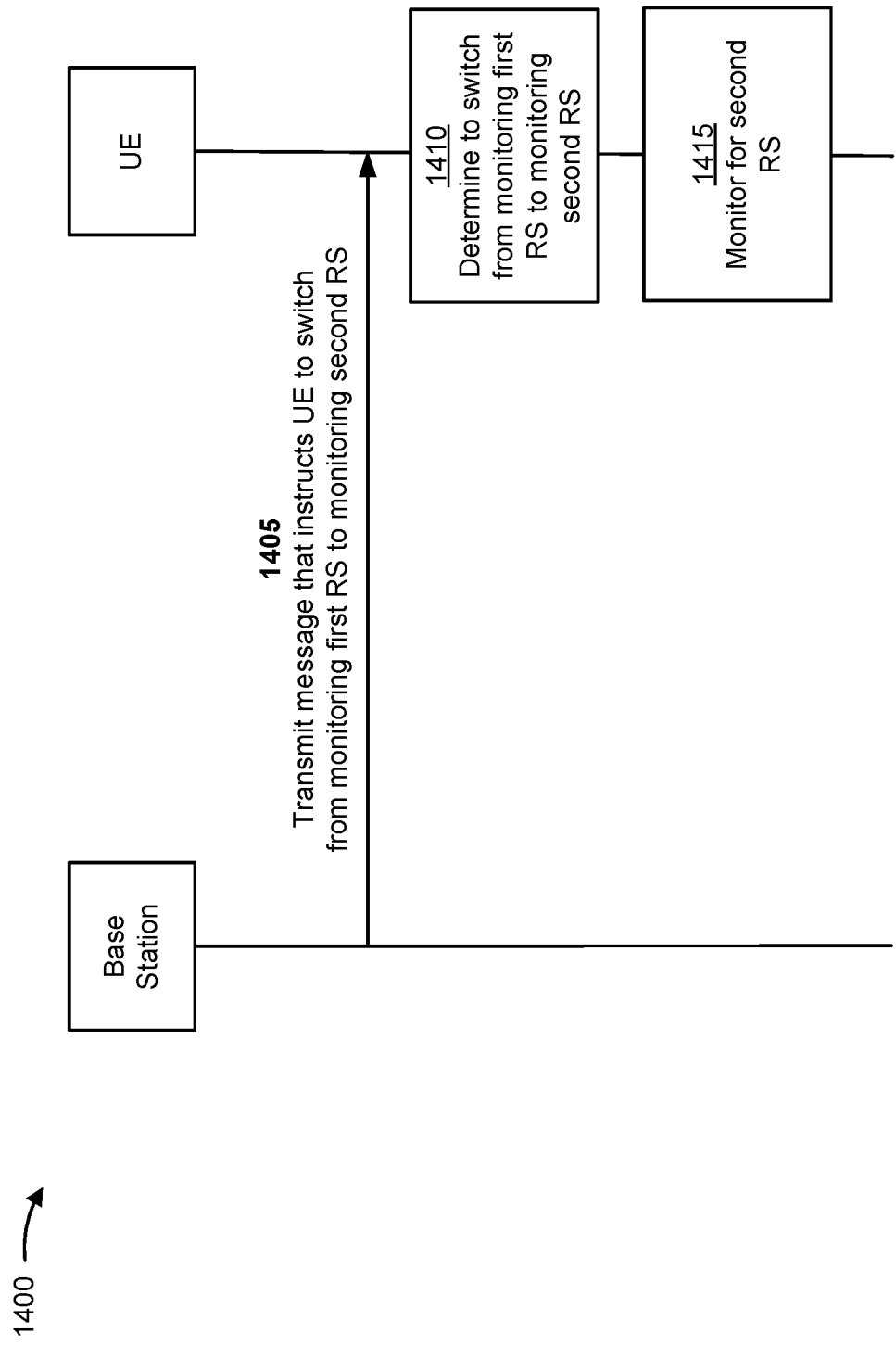
FIG. 14 is a diagram illustrating an example of switching reference signals for beam or link failure detection, in accordance with the present disclosure.

FIG. 14 is a diagram illustrating an example 1400 of switching reference signals for beam or link failure detection, in accordance with the present disclosure. As shown in FIG. 14, a UE (e.g., UE 120, UE 320) may communicate (e.g., transmit an uplink transmission and/or receive a downlink transmission) with a base station (e.g., BS 110, BS 310). The UE and the base station may be part of a wireless network (e.g., wireless network 100).

As shown by reference number 1405, the base station may transmit a message instructing the UE to switch from monitoring a first reference signal to monitoring a second reference signal. The message may be an RRC message, a MAC-CE, or DCI.

As shown by reference number 1410, the UE may determine to switch from monitoring the first reference signal to monitoring the second reference signal. The UE may transmit a request for a base station to switch from configuring the UE with the first reference signal to configuring the UE with the second reference signal based at least in part on a determination that a gain of the first reference signal does not satisfy a gain threshold. The UE may receive the message from the base station in response to the request. As shown by reference number 1415, the UE may monitor for the second reference signal.

As indicated above, FIG. 14 is provided as an example. Other examples may differ from what is described with regard to FIG. 14.

Figure 15:
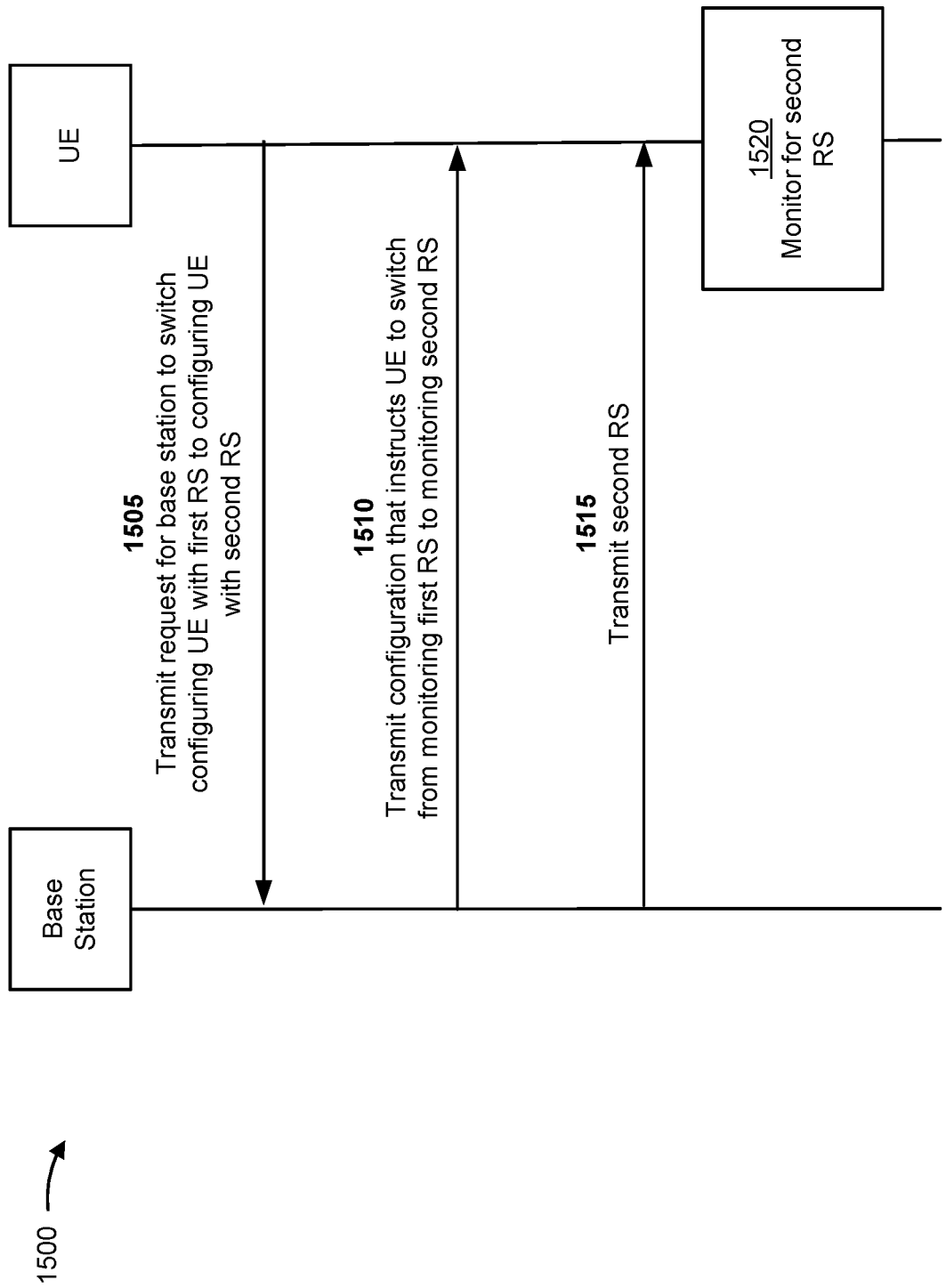
FIG. 15 is a diagram illustrating an example of switching reference signals for beam or link failure detection, in accordance with the present disclosure.

FIG. 15 is a diagram illustrating an example 1500 of switching reference signals for beam or link failure detection, in accordance with the present disclosure. As shown in FIG. 14, a UE (e.g., UE 120, UE 320) may communicate (e.g., transmit an uplink transmission and/or receive a downlink transmission) with a base station (e.g., BS 110, UE 310). The UE and the base station may be part of a wireless network (e.g., wireless network 100).

As shown by reference number 1505, the UE may transmit, to the base station, a request for the base station to switch from configuring the UE with a first reference signal to configuring the UE with a second reference signal. The message may be an RRC message, a MAC-CE, or DCI. The first reference signal may be an RLM reference signal, a BFD reference signal, or an SSB. The second reference signal may be a CSI-RS.

As shown by reference number 1510, the base station may transmit a configuration to switch from monitoring for the first reference signal to monitoring for the second reference signal. The configuration may be transmitted in an RRC message, a MAC-CE, or DCI.

As shown by reference number 1515, the base station may transmit the second reference signal. As shown by reference number 1520, the UE may monitor for the second reference signal based at least in part on receiving the configuration. As part of the monitoring, the UE may receive the second reference signal. In one example, the UE may start monitoring before or at the same time that the base station transmits the second reference signal.

As indicated above, FIG. 15 is provided as an example. Other examples may differ from what is described with regard to FIG. 15.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving, from the base station, a configuration to switch from monitoring for the first reference signal to monitoring for the second reference signal; and monitoring for the second reference signal based at least in part on receiving the configuration.

Aspect 2: The method of Aspect 1, wherein the first reference signal is one of a radio link monitoring reference signal or a beam failure detection reference signal.

Aspect 3: The method of Aspect 1, wherein the first reference signal is a synchronization signal block, and the second reference signal is a channel state information reference signal.

Aspect 4: The method of any of Aspects 1-3, wherein the configuration is received in a radio resource configuration message, a medium access control control element (MAC-CE), or downlink control information.

Aspect 5: The method of any of Aspects 1-4, wherein the request is transmitted if a gain of the first reference signal does not satisfy a gain threshold.

Aspect 6: The method of any of Aspects 1-5, wherein the request is transmitted if a quality of the first reference signal does not satisfy a quality threshold.

Aspect 7: A method of wireless communication performed by a base station, comprising: receiving, from a user equipment (UE), a request for the base station to switch from configuring the UE with a first reference signal to configuring the UE with a second reference signal; and transmitting a configuration to switch from monitoring for the first reference signal to monitoring for the second reference signal.

Aspect 8: The method of Aspect 7, wherein the first reference signal is a synchronization signal block, and the second reference signal is a channel state information reference signal.

Aspect 9: The method of Aspect 7 or 8, wherein the configuration is transmitted if a gain of the first reference signal does not satisfy a gain threshold.

Aspect 10: The method of any of Aspects 7-9, wherein the configuration is transmitted in a radio resource configuration message, a medium access control control element (MAC-CE), or downlink control information.

Aspect 11: The method of any of Aspects 7-10, wherein the configuration is transmitted if a quality of the first reference signal does not satisfy a quality threshold.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

The following provides an overview of some other Aspects of the present disclosure:

Aspect 17: A method of wireless communication performed by a user equipment (UE), comprising: transmitting, to a base station, a request for the base station to switch from configuring the UE with a first reference signal to configuring the UE with a second reference signal; receiving, from the base station, a configuration to switch from monitoring for the first reference signal to monitoring for the second reference signal; and monitoring for the second reference signal based at least in part on receiving the configuration.

Aspect 18: The method of Aspect 17, wherein the monitoring includes receiving the second reference signal.

Aspect 19: The method of Aspect 17 or 18, wherein the first reference signal is one of a radio link monitoring reference signal or a beam failure detection reference signal.

Aspect 20: The method of any of Aspects 17-19, wherein the first reference signal is a synchronization signal block, and the second reference signal is a channel state information reference signal.

Aspect 21: The method of any of Aspects 17-20, wherein the configuration is received in a radio resource configuration message, a medium access control control element (MAC-CE), or downlink control information.

Aspect 22: The method of any of Aspects 17-21, wherein the request is transmitted if a gain of the first reference signal does not satisfy a gain threshold.

Aspect 23: The method of any of Aspects 17-22, wherein the request is transmitted if a quality of the first reference signal does not satisfy a quality threshold.

Aspect 24: A method of wireless communication performed by a base station, comprising: receiving, from a user equipment (UE), a request for the base station to switch from configuring the UE with a first reference signal to configuring the UE with a second reference signal; and transmitting a configuration to switch from monitoring the first reference signal to monitoring the second reference signal.

Aspect 25: The method of Aspect 24, wherein the first reference signal is a synchronization signal block, and the second reference signal is a channel state information reference signal.

Aspect 26: The method of Aspect 24 or 25, wherein the configuration is transmitted if a gain of the first reference signal does not satisfy a gain threshold.

Aspect 27: The method of any of Aspects 24-26, wherein the configuration is transmitted in a radio resource configuration message, a medium access control control element (MAC-CE), or downlink control information.

Aspect 28: The method of any of Aspects 24-27, wherein the configuration is transmitted if a quality of the first reference signal does not satisfy a quality threshold.

Aspect 29: An apparatus for wireless communication at a device, comprising a processor; memory coupled with the processor; and instructions stored in the memory and executable by the processor to cause the apparatus to perform the method of one or more Aspects of Aspects 17-28.

Aspect 30: A device for wireless communication, comprising a memory and one or more processors coupled to the memory, the memory and the one or more processors configured to perform the method of one or more Aspects of Aspects 17-28.

Aspect 31: An apparatus for wireless communication, comprising at least one means for performing the method of one or more Aspects of Aspects 17-28.

Aspect 32: A non-transitory computer-readable medium storing code for wireless communication, the code comprising instructions executable by a processor to perform the method of one or more Aspects of Aspects 17-28.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 17-28.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, and/or not equal to the threshold.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to cause the UE to:
   detect that the UE is going out of coverage of a first reference signal before a request is transmitted;
   transmit, in a radio resource configuration (RRC) message, a medium access control control element (MAC-CE), or uplink control information (UCI), the request to switch from configuring the UE with the first reference signal for radio link monitoring (RLM) to configuring the UE with a second reference signal;
   receive a configuration to switch from monitoring for the first reference signal to monitoring for the second reference signal; and
   monitor for the second reference signal based at least in part on the configuration.

2. The apparatus of claim 1, wherein the first reference signal is a synchronization signal block.

3. The apparatus of claim 1, wherein the second reference signal is a channel state information reference signal.

4. The apparatus of claim 1, wherein the one or more processors, to monitor for the second reference signal, are configured to cause the UE to receive the second reference signal.

5. Apparatus of claim 1, wherein the one or more processors, to receive the configuration, are configured to cause the UE to receive the configuration in another RRC message, another MAC-CE, or downlink control information (DCI).

6. The apparatus of claim 1, wherein the one or more processors, to transmit the request, are configured to cause the UE to transmit the request based on a gain of the first reference signal being lower than a gain threshold.

7. The apparatus of claim 1, wherein the one or more processors, to transmit the request, are configured to cause the UE to transmit the request based on a quality of the first reference signal being lower than a quality threshold.

8. The apparatus of claim 1, wherein the request is a request for a network entity to switch from configuring the UE with monitoring for the first reference signal for RLM to monitoring for the second reference signal.

9. The apparatus of claim 8, wherein the network entity is a base station.

10. The apparatus of claim 1, wherein the one or more processors, to transmit the request, are configured to cause the UE to transmit the request based on a measurement report for a configured reference signal being below a quality threshold.

11. The apparatus of claim 1, wherein the one or more processors, to transmit the request, are configured to cause the UE to transmit the request in the RRC message.

12. The apparatus of claim 1, wherein the one or more processors, to transmit the request, are configured to cause the UE to transmit the request in the MAC-CE.

13. The apparatus of claim 1, wherein the one or more processors, to transmit the request, are configured to cause the UE to transmit the request in the UCI.

14. A method of wireless communication performed at a user equipment (UE), comprising:
   detecting that the UE is going out of coverage of a first reference signal before a request is transmitted;
   transmitting, in a radio resource configuration (RRC) message, a medium access control control element (MAC-CE), or uplink control information (UCI), the request to switch from configuring the UE with the first reference signal for radio link monitoring (RLM) to configuring the UE with a second reference signal;
   receiving a configuration to switch from monitoring for the first reference signal to monitoring for the second reference signal; and
   monitoring for the second reference signal based at least in part on the configuration.

15. The method of claim 14, wherein the first reference signal is a synchronization signal block.

16. The method of claim 14, wherein the second reference signal is a channel state information reference signal.

17. The method of claim 14, wherein monitoring for the second reference signal comprises receiving the second reference signal.

18. The method of claim 14, wherein receiving the configuration comprises receiving the configuration in another RRC message, another MAC-CE, or downlink control information (DCI).

19. The method of claim 14, wherein transmitting the request comprises transmitting the request based on a gain of the first reference signal being lower than a gain threshold.

20. The method of claim 14, wherein transmitting the request comprises transmitting the request based on a quality of the first reference signal being lower than a quality threshold.

21. The method of claim 14, wherein the request is a request for a network entity to switch from configuring the UE with monitoring for the first reference signal for RLM to monitoring for the second reference signal.

22. The method of claim 21, wherein the network entity is a base station.

23. The method of claim 14, wherein transmitting the request comprises transmitting the request based on a measurement report for a configured reference signal being below a quality threshold.

24. An apparatus for wireless communication at a network entity, comprising:
a memory; and
one or more processors coupled to the memory, the one or more processors configured to cause the network entity to:
receive, in a radio resource configuration (RRC) message, a medium access control control element (MAC-CE), or uplink control information (UCI) and from a user equipment (UE) that detects that the UE is going out of coverage of a first reference signal before a request is received, the request to switch from configuring with the first reference signal for radio link monitoring (RLM) to configuring with a second reference signal; and
transmit a configuration to switch from monitoring the first reference signal to monitoring the second reference signal.

25. The apparatus of claim 24, wherein the first reference signal is a synchronization signal block.

26. The apparatus of claim 24, wherein the second reference signal is a channel state information reference signal.

27. The apparatus of claim 24, wherein the one or more processors, to transmit the configuration, are configured to cause the network entity to transmit the configuration based on a gain of the first reference signal being lower than a gain threshold.

28. The apparatus of claim 24, wherein the one or more processors, to receive the request, are configured to cause the UE to receive the request in the RRC message.

29. The apparatus of claim 24, wherein the one or more processors, to receive the request, are configured to cause the UE to receive the request in the MAC-CE.

30. A method of wireless communication performed at a network entity, comprising:
receiving, in a radio resource configuration (RRC) message, a medium access control control element (MAC-CE), or uplink control information (UCI) and from a user equipment (UE) that detects that the UE is going out of coverage of a first reference signal before a request is received, the request to switch from configuring with the first reference signal for radio link monitoring (RLM) to configuring with a second reference signal; and
transmitting a configuration to switch from monitoring for the first reference signal to monitoring for the second reference signal.

31. The method of claim 30, wherein the first reference signal is a synchronization signal block, and
wherein the second reference signal is a channel state information reference signal.

32. A non-transitory computer-readable medium storing a set of instructions for wireless communication, the set of instructions comprising:
one or more instructions that, when executed by one or more processors of a user equipment (UE), cause the UE to:
detect that the UE is going out of coverage of a first reference signal before a request is transmitted;
transmit, in a radio resource configuration (RRC) message, a medium access control control element (MAC-CE), or uplink control information (UCI), the request to switch from configuring the UE with the first reference signal for radio link monitoring (RLM) to configuring the UE with a second reference signal;
receive a configuration to switch from monitoring for the first reference signal to monitoring for the second reference signal; and
monitor for the second reference signal based at least in part on the configuration.

33. A non-transitory computer-readable medium storing a set of instructions for wireless communication, the set of instructions comprising:
one or more instructions that, when executed by one or more processors of a network entity, cause the network entity to:
receive, in a radio resource configuration (RRC) message, a medium access control control element (MAC-CE), or uplink control information (UCI) and from a user equipment (UE) that detects that the UE is going out of coverage of a first reference signal before a request is transmitted, the request to switch from configuring with the first reference signal for radio link monitoring (RLM) to configuring with a second reference signal; and
transmit a configuration to switch from monitoring the first reference signal to monitoring the second reference signal.

\* \* \* \* \*